United States Patent
Nayar et al.

(10) Patent No.: US 7,554,596 B2
(45) Date of Patent: Jun. 30, 2009

(54) METHOD AND APPARATUS FOR RECORDING A SEQUENCE OF IMAGES USING A MOVING OPTICAL ELEMENT

(75) Inventors: Shree K. Nayar, New York, NY (US); Yoav Y. Schechner, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 700 days.

(21) Appl. No.: 10/474,580

(22) PCT Filed: Apr. 15, 2002

(86) PCT No.: PCT/US02/11908

§ 371 (c)(1),
(2), (4) Date: Oct. 12, 2004

(87) PCT Pub. No.: WO02/085000

PCT Pub. Date: Oct. 24, 2002

(65) Prior Publication Data

US 2005/0041113 A1    Feb. 24, 2005

Related U.S. Application Data

(60) Provisional application No. 60/283,777, filed on Apr. 13, 2001.

(51) Int. Cl.
  *H04N 5/225* (2006.01)
(52) U.S. Cl. .................................... 348/335; 348/219.1
(58) Field of Classification Search .............. 348/218.1, 348/219.1, 344, 270, 271, 268, 269, 342
See application file for complete search history.

(56) References Cited

U.S. PATENT DOCUMENTS

| 4,383,170 A * | 5/1983 | Takagi et al. ................. 250/216 |
| 5,016,109 A | 5/1991 | Gaylord ....................... 358/225 |
| 5,363,136 A | 11/1994 | Sztanko et al. .............. 348/207 |
| 5,398,058 A | 3/1995 | Hattori ........................ 348/224 |
| 5,757,423 A | 5/1998 | Tanaka et al. ................ 348/218 |
| 6,388,709 B1 * | 5/2002 | Kobayashi et al. .......... 348/362 |
| 6,885,404 B1 * | 4/2005 | Suda ........................... 348/342 |
| 7,061,532 B2 * | 6/2006 | Silverstein ................... 348/335 |

* cited by examiner

*Primary Examiner*—David L Ometz
*Assistant Examiner*—Luong T Nguyen
(74) *Attorney, Agent, or Firm*—Baker Botts LLP

(57) ABSTRACT

An imager (200) including a spatially varying optical element (204) which moves while the imager records a sequence of images. The optical element (204) can be an intensity reduction filter, a spectral or polarization filter, or a refractive or reflective element. Because the optical element (204) moves between frames, each scene portion is captured under a range of imaging conditions. A spatially varying intensity reduction filter enables imaging of each scene portion using multiple, different exposure to generate a high dynamic range image. A spatially varying spectral or polarization filter enables measurement of the spectral or polarization characteristics of radiation from each scene portion. A refractive or reflective element enables imaging of scene portions under various focal characteristics, thereby providing depth information and producing an image which is focused everywhere. A refractive or reflective element is used to apply different vertical and/or horizontal shifts to the different frames, thereby generating an enhanced-resolution image.

16 Claims, 26 Drawing Sheets

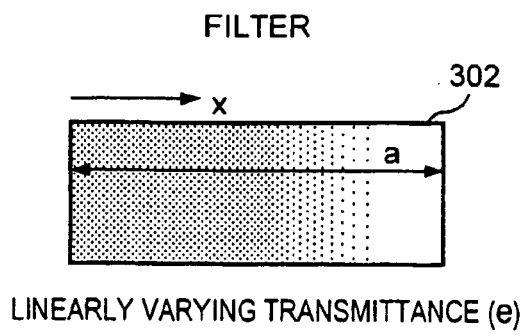
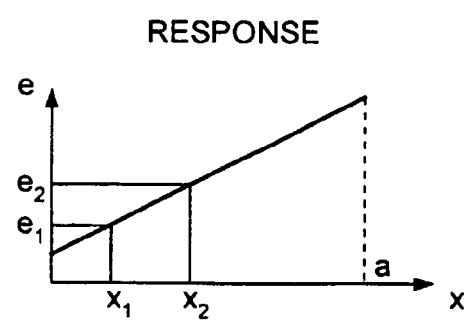
FIG. 3A          FIG. 3B
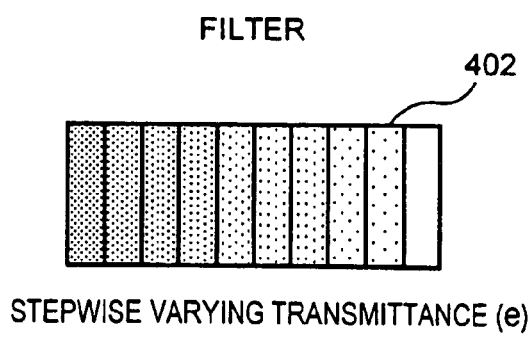
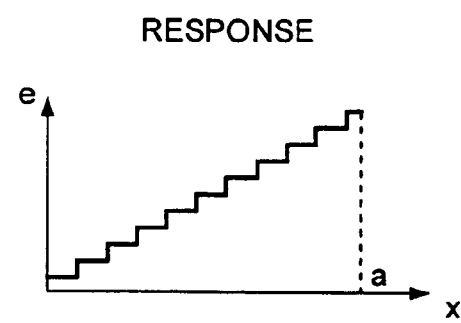
FIG. 4A          FIG. 4B
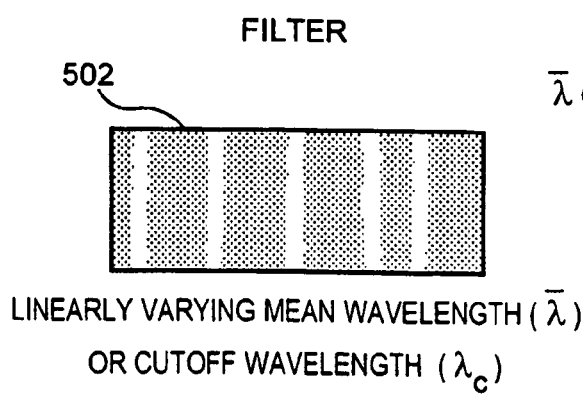
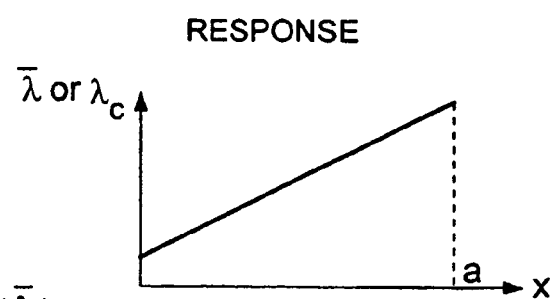
FIG. 5A          FIG. 5B

FILTER

STEPWISE VARYING POLARIZATION
ANGLE ($\theta_P$)

RESPONSE

FILTER

LINEARLY VARYING THICKNESS (t)

RESPONSE

FILTER

CIRCULARLY VARYING TRANSMITTANCE (e)

RESPONSE

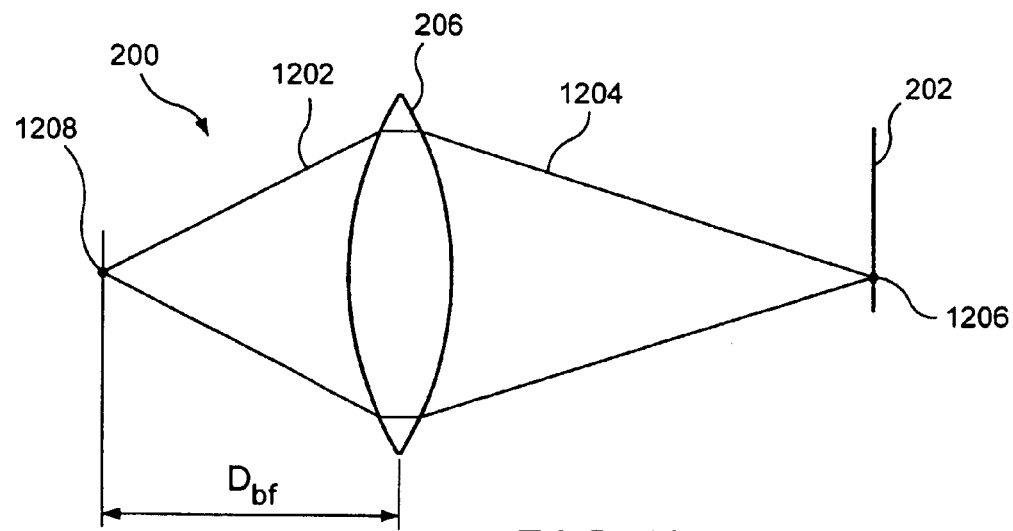
F I G. 12A
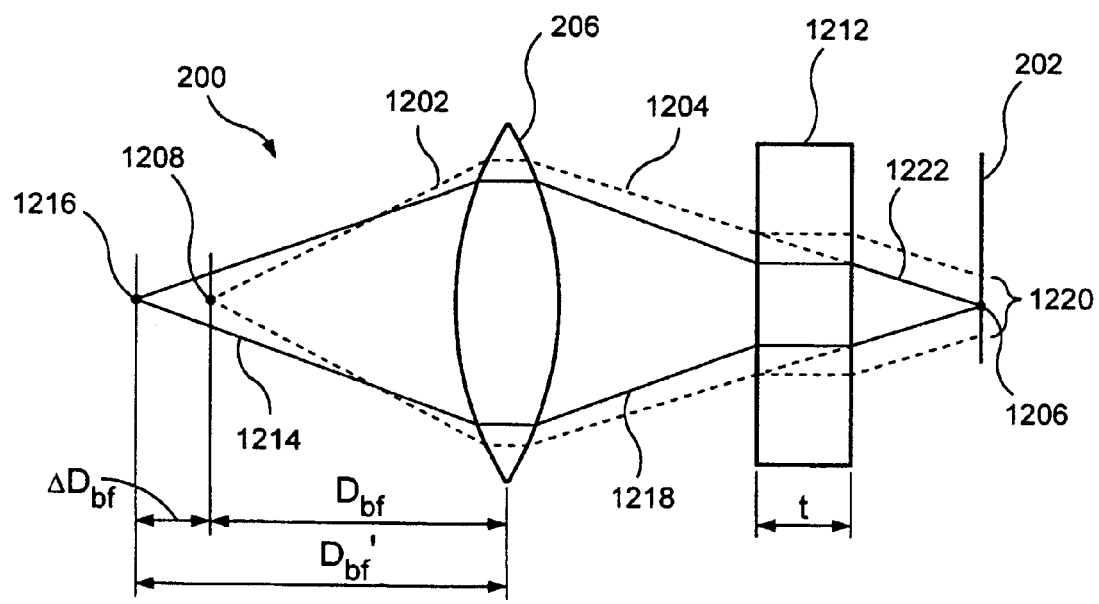
F I G. 12B

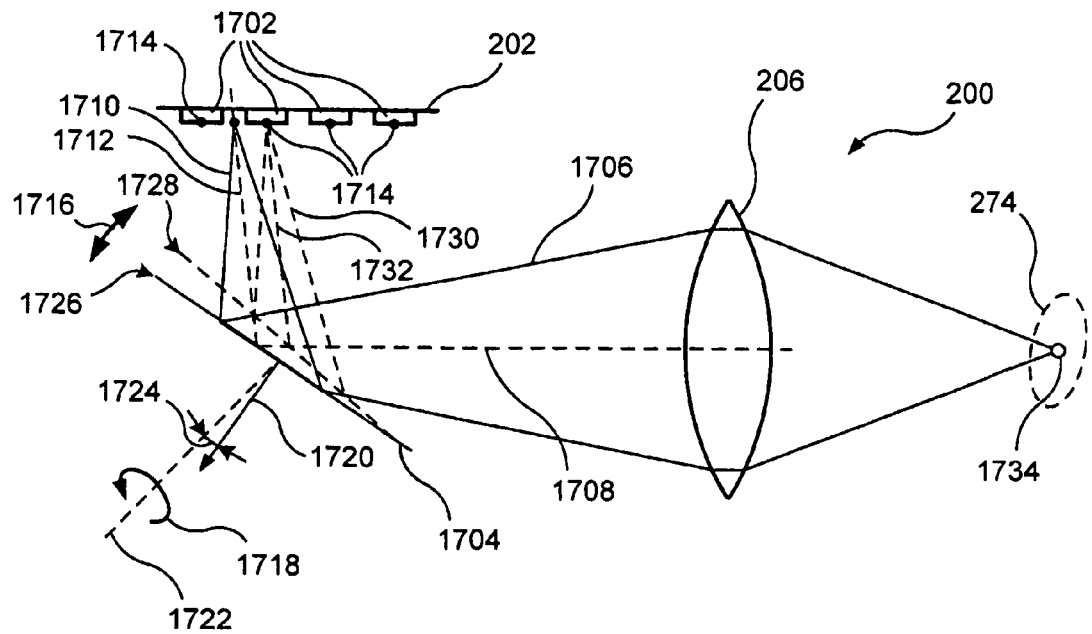
F I G. 17
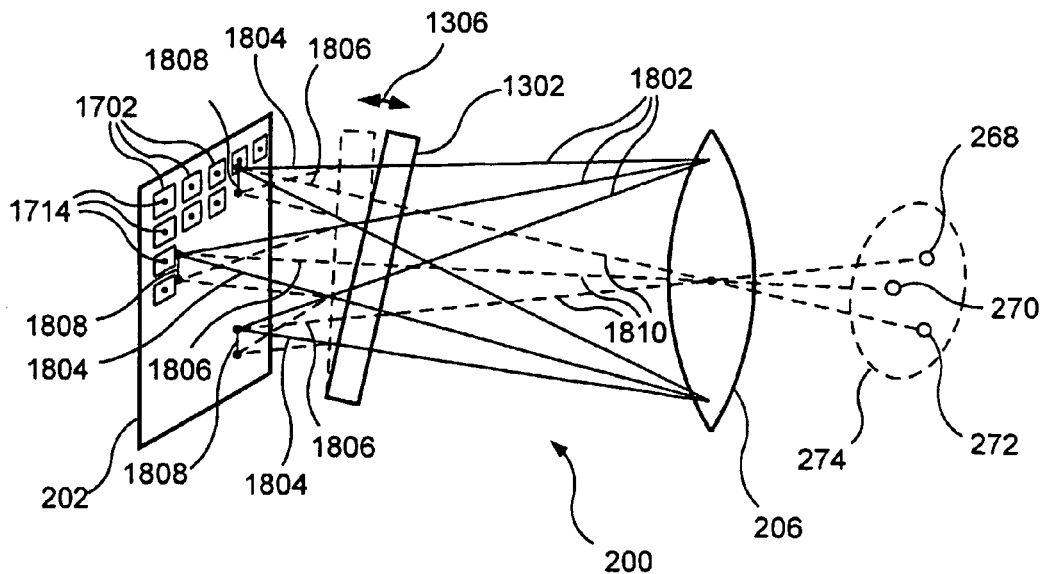
F I G. 18

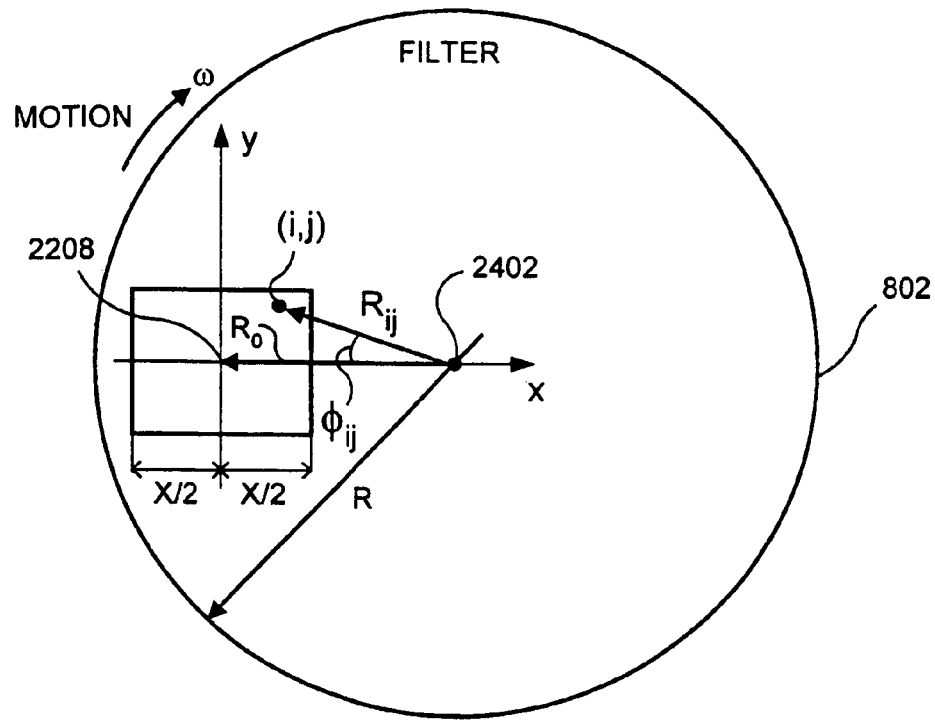
F I G. 24
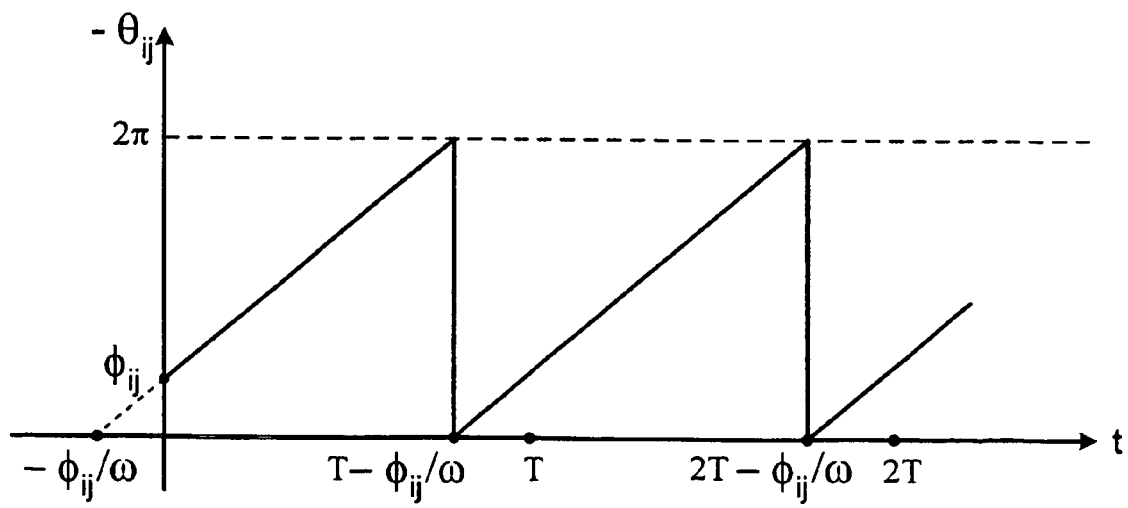
F I G. 25

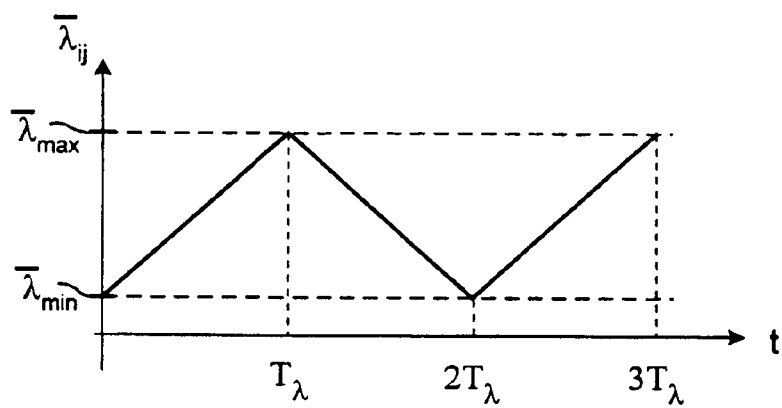
F I G. 28A
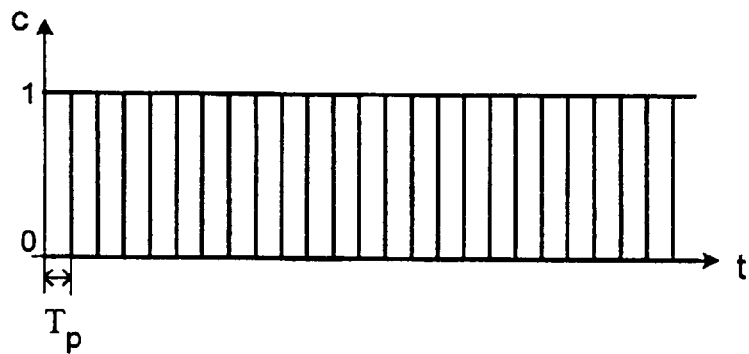
F I G. 28B
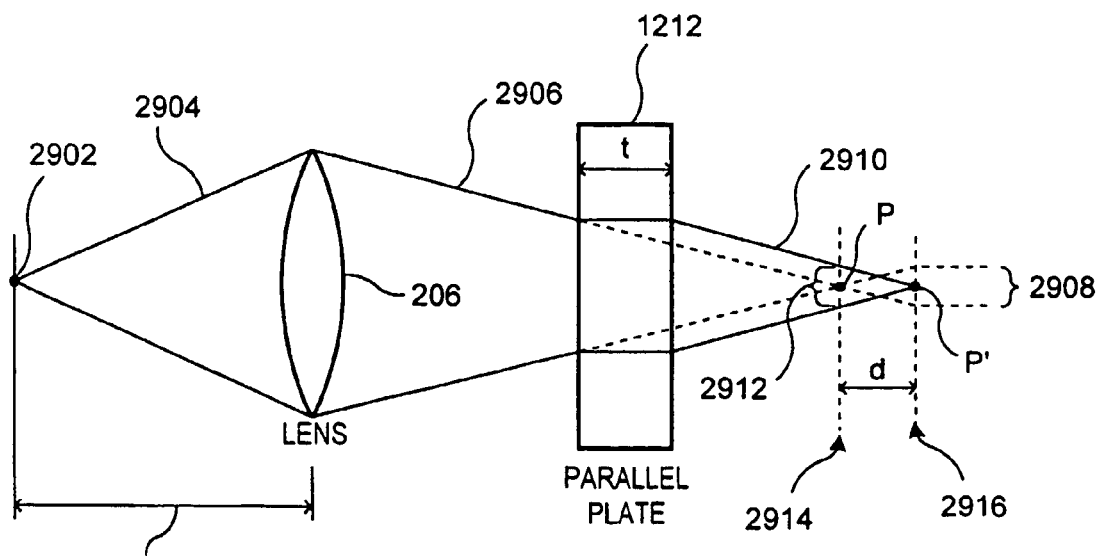
F I G. 29

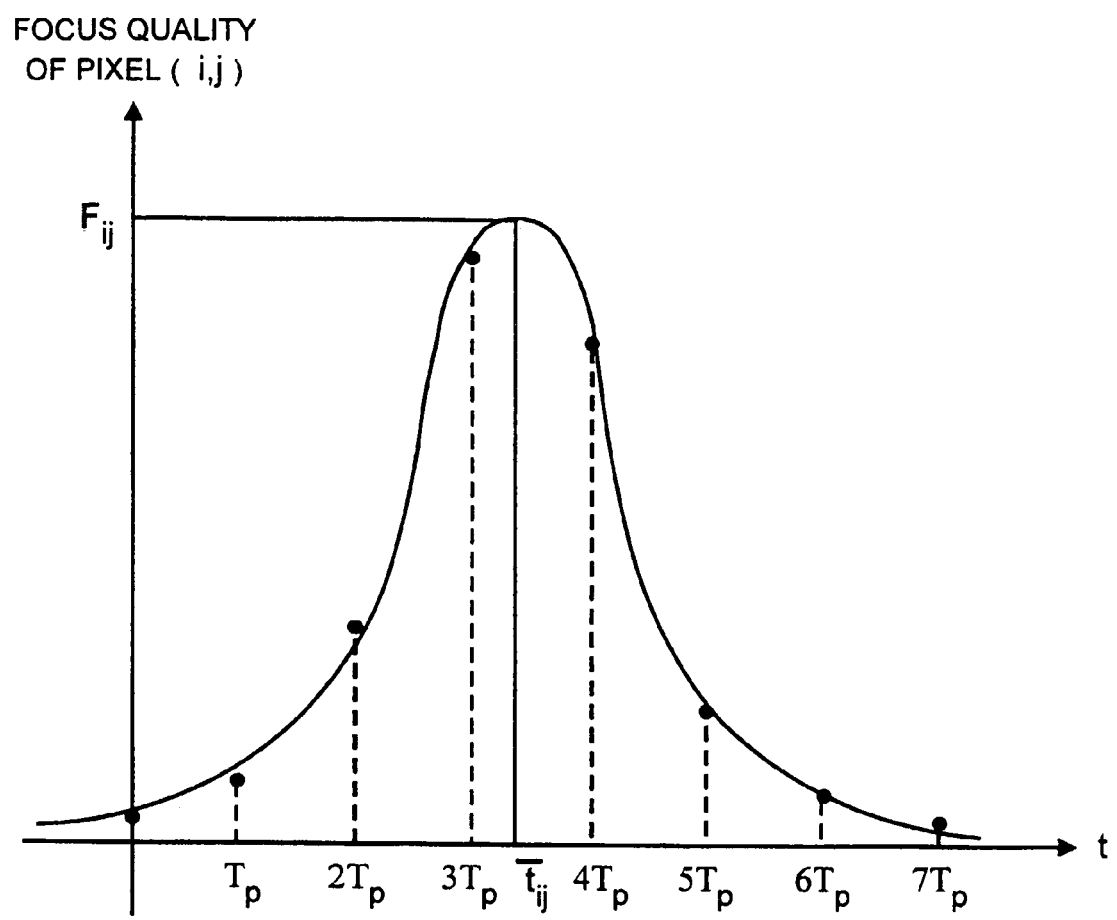
F I G. 30

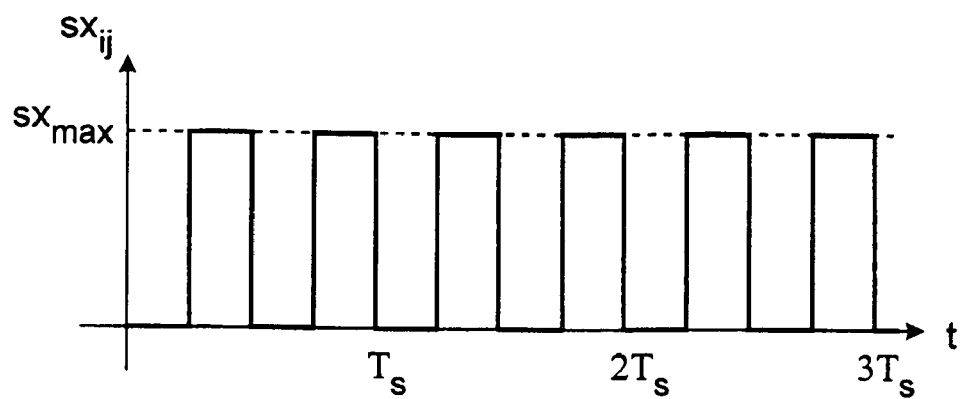
F I G. 31A
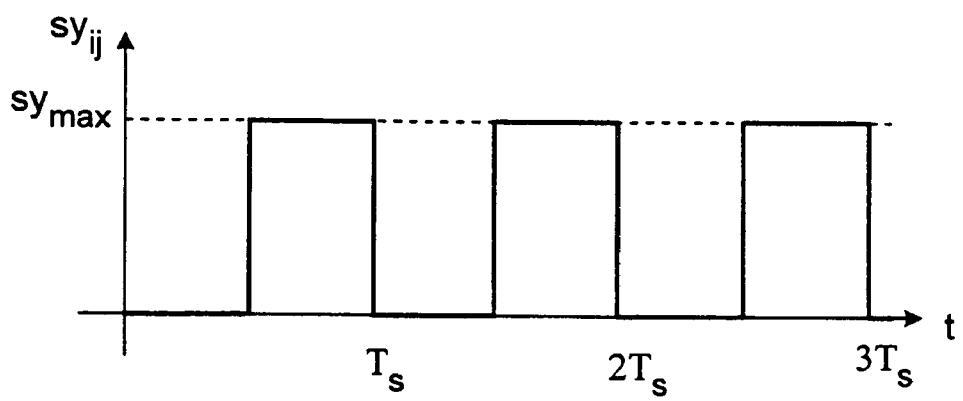
F I G. 31B
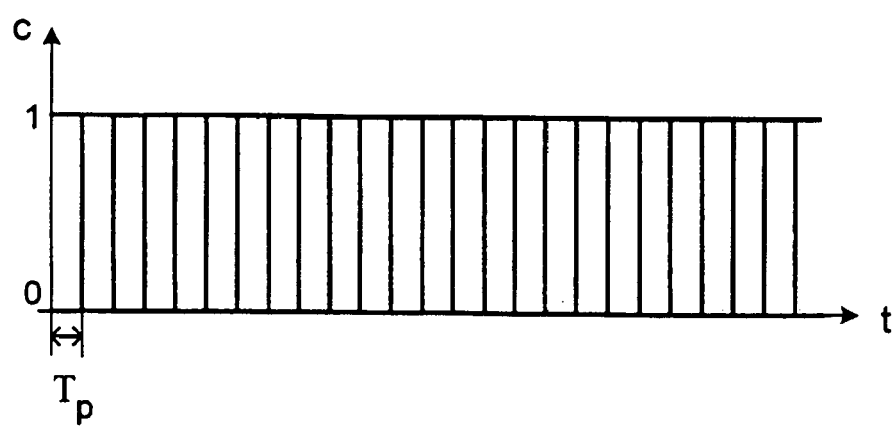
F I G. 31C

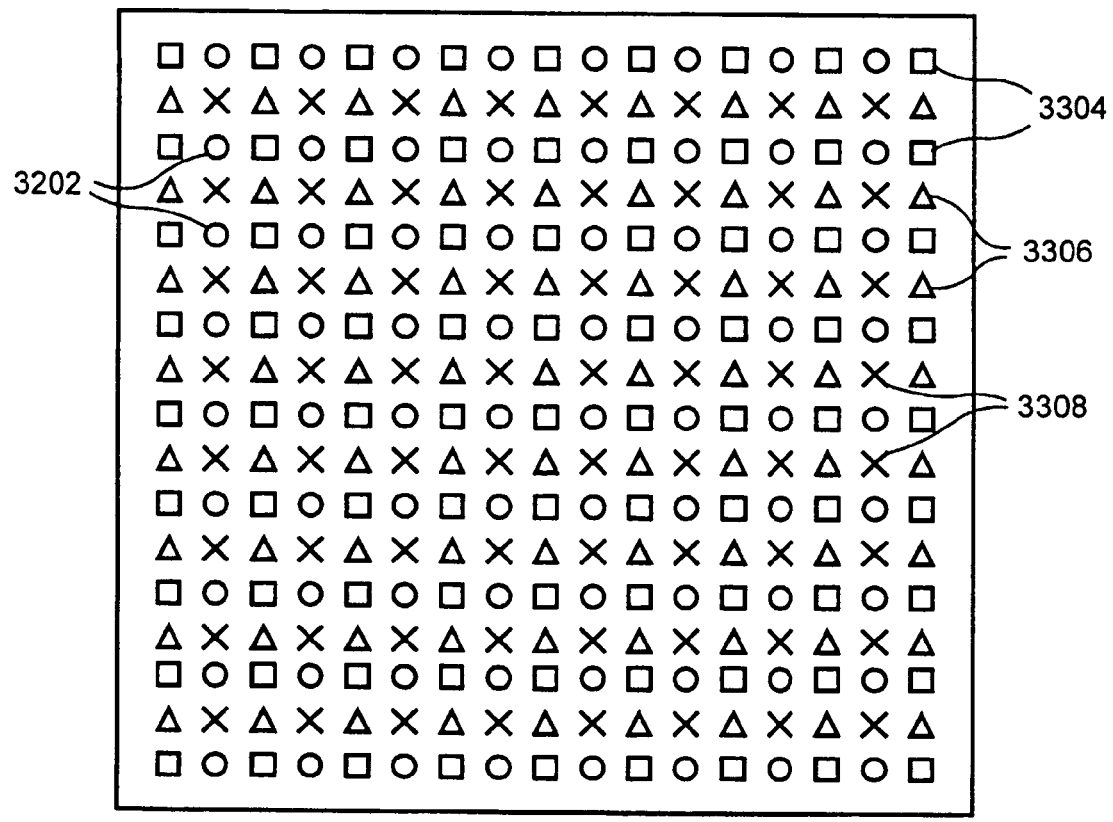
F I G. 32

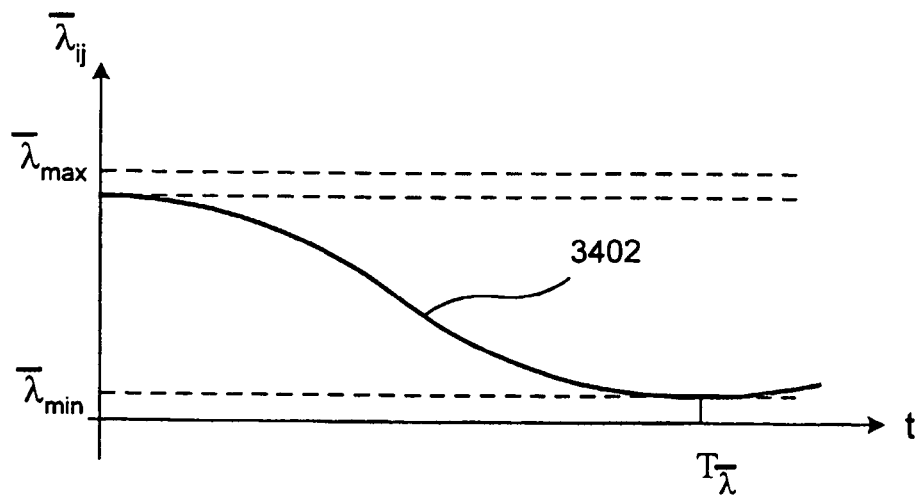
F I G. 34A
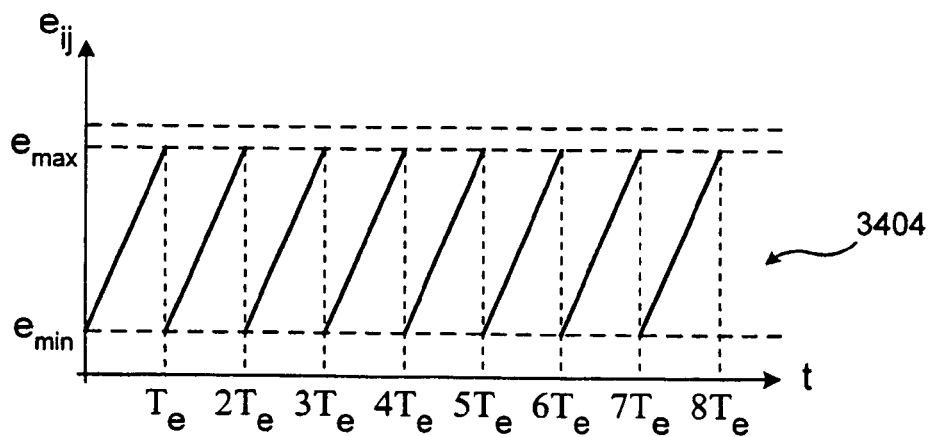
F I G. 34B
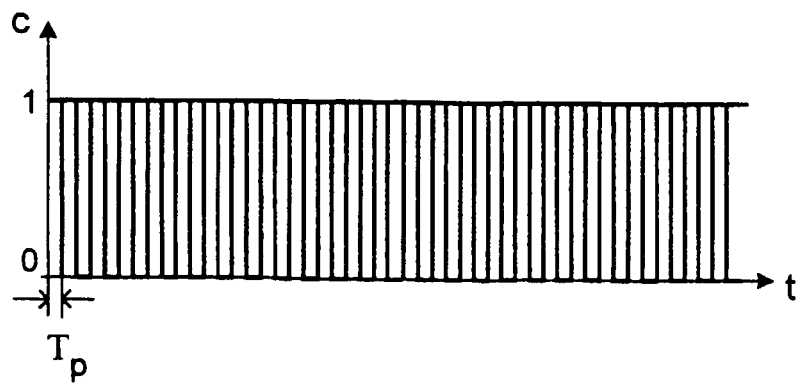
F I G. 34C

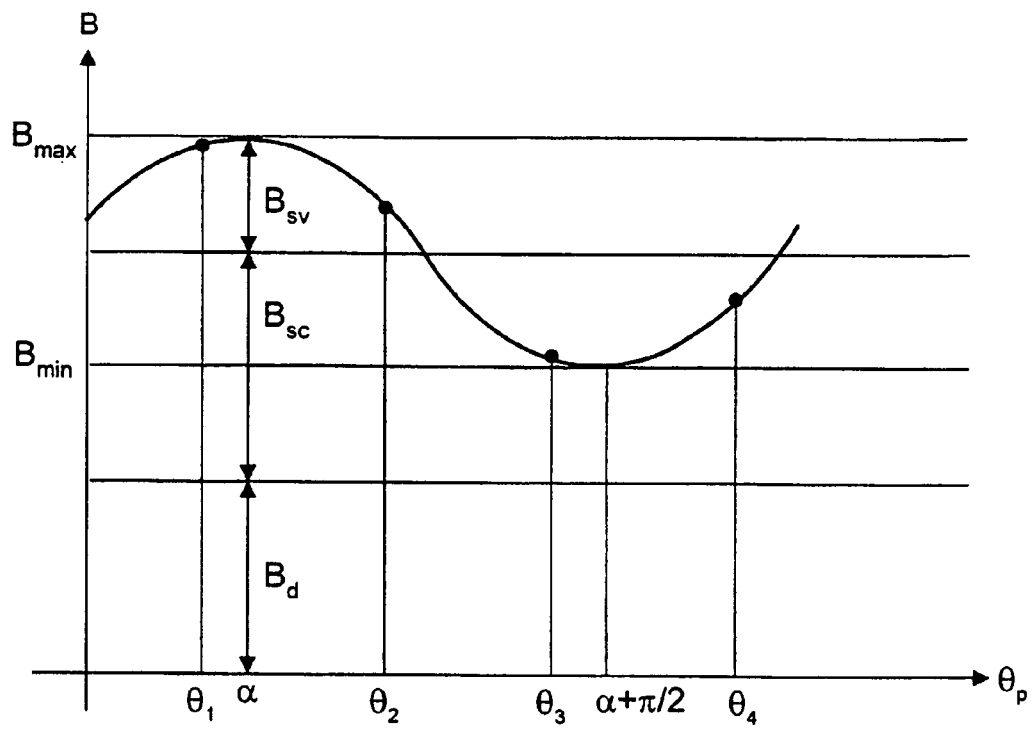
F I G. 35
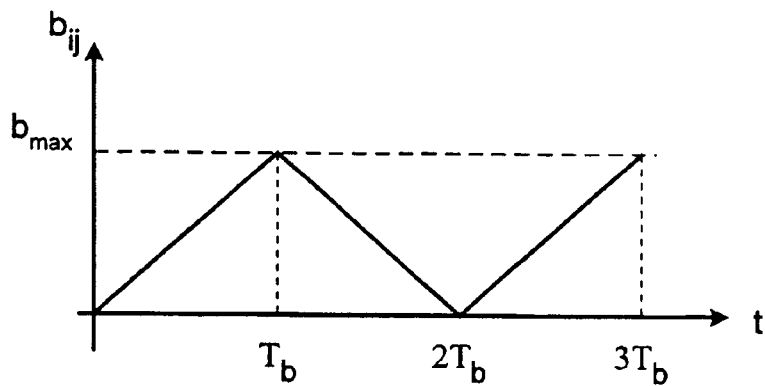
F I G. 36A
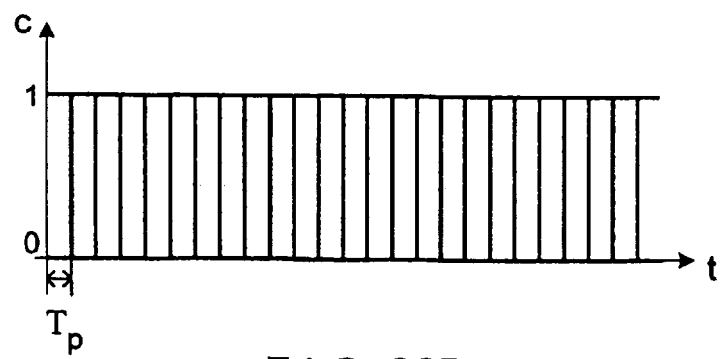
F I G. 36B

METHOD AND APPARATUS FOR RECORDING A SEQUENCE OF IMAGES USING A MOVING OPTICAL ELEMENT

CROSS-REFERENCE TO RELATED APPLICATION

This application claims priority to U.S. Provisional Patent Application Ser. No. 60/283,777, entitled "Method and Apparatus For Image Sensing With Temporal Scanning of Imaging Dimensions," filed on Apr. 13, 2001, which is incorporated herein by reference in its entirety.

STATEMENT REGARDING FEDERALLY SPONSORED RESEARCH OR DEVELOPMENT

This invention was partially made with U.S. Government support from the National Science Foundation Research Award No. IIS-00-85864. Accordingly, the U.S. Government may have certain rights in this invention.

BACKGROUND OF THE INVENTION

Conventional imagers suffer from shortcomings with respect to the quality of data they can produce. For example, a typical imager has limited spatial resolution and has limited dynamic range for measuring the brightness, color, and polarization of light. For example, conventional cameras can have spatial resolution as low as 640×480 pixels, and color resolution as low as 8 bits. Furthermore, most non-stereoscopic imagers are unable to measure scene depth—i.e., the distance between the imager and the object being imaged. Such limitations render many conventional imagers inadequate for certain computational vision tasks such as, for example, feature detection, object recognition, motion measurement, and scene reconstruction.

Efforts have been made to enhance the quality of image data generated by video and still cameras. For example, in order to enhance the resolution and dynamic range of image data, and/or to provide additional information such as polarization data, it is possible to record multiple images of the same scene, each image taken under a different camera configuration. In one such technique, illustrated in FIG. 21, a filter wheel 2104 containing several different optical filters 2106 is mounted in front of the objective lens 2102 of a camera 2108. Each of the filters 2106 has a different optical characteristic such as a particular intensity reduction factor, spectral filtering characteristic, polarization filtering characteristic, or other optical characteristic. Each image is recorded using a different filter 2106. Between images the filter wheel 2104 is rotated about an axis of rotation 2110.

However, such a filtering technique tends to be cumbersome, because the filters 2106 must be sufficiently large to cover the field of view of the camera 2108. This requirement makes the filter wheel 2104 bulky and heavy, and therefore, a substantial amount of energy is required to move the filter wheel 2104 between frames. As a result, the frame rate of the system tends to be too slow for real-time imaging. In addition, such an arrangement requires each image to be recorded through a single filter 2106, and therefore, the switching of the filters 2106 must be synchronized with the image frames. The limited speed at which the filters 2106 can be switched thus reduces the rate at which images can be captured. Furthermore, synchronization requires additional timing circuitry.

SUMMARY OF THE INVENTION

It is therefore an object of the present invention to provide an imaging system having enhanced spatial resolution, as well as enhanced resolution and dynamic range with respect to color, polarization, depth, and brightness.

It is a further object of the present invention to provide an imaging system which provides such enhanced resolution and dynamic range without substantially reducing the rate at which images can be recorded.

These and other objects are accomplished by the following aspects of the present invention. In accordance with one aspect of the present invention, a method for imaging comprises the steps of: (1) recording a first image using an optical element having first and second portions; (2) moving the optical element in the reference frame of an imager after the step of recording the first image; and (3) recording a second image using the optical element after the step of moving the optical element. The step of recording the first image comprises: (a) receiving a first radiation ray bundle by a first portion of the optical element, the first radiation ray bundle having a first chief ray in the reference frame of the imager; (b) optically processing the first radiation ray bundled by the first portion of the optical element, for producing a second radiation ray bundle, the first portion of the optical element having a first optical characteristic with respect to the radiation ray bundles that it optically processes; (c) measuring the intensity of the second radiation ray bundle by an image detector which is included in the imager; (d) receiving a third radiation ray bundle by a second portion of the optical element, the third radiation ray bundle having a second chief ray in the reference frame of imager, the second chief ray being different from the first chief ray; (e) optically processing the third radiation ray bundle by the second portion of the first optical element, for producing a fourth radiation ray bundle, the second portion of the first optical element having a second optical characteristic with respect to radiation ray bundles that it optically processes, and the second optical characteristic being different from the first optical characteristic; and (f) measuring the intensity of the fourth radiation ray bundle by the image detector. After the step of moving the optical element, radiation ray bundles having the first chief ray are received, and optically processed, by at least one of the second portion of the optical element and a third portion of the optical element, the third portion having a third optical characteristic with respect to radiation ray bundles that it optically processes, and the third optical characteristic being different from the first optical characteristic. The step of recording the second image comprises: (a) receiving a fifth radiation ray bundle by the at least one of the second and third portions of the optical element, the fifth radiation ray bundle having the first chief ray; (b) optically processing the fifth radiation ray bundle by the at least one of the second and third portions of the optical element, for producing a sixth radiation ray bundle; and (c) measuring the intensity of the sixth radiation ray bundle by the image detector.

In accordance with an additional aspect of the present invention, a method for imaging comprises the steps of: (1) continuously moving an optical element in a reference frame of an imager, the optical element comprising a refractive element, a reflective element, and/or an interference filter, the imager including an image detector, and the step of continuously moving the optical element comprising: (a) moving the optical element into a first position in the reference frame of the imager during a first time period, and (b) moving the optical element into a second position in the reference frame of the imager during a second time period, the second position being different from the first position; (2) receiving a first set of radiation ray bundles by the optical element during the first time period; (3) optically processing the first set of radiation ray bundles by the optical element during the first time period, for producing a second set of radiation ray bundles; (4) detecting the second set of radiation ray bundles by the image detector during the first time period, for recording a first image; (5) receiving a third set of radiation ray bundles by the optical element during the second time period; (6) optically processing the third set of radiation ray bundles by the optical element during the second time period, for producing a fourth set of radiation ray bundles; and (7) detecting the fourth set of radiation ray bundles by the image detector during the second time period, for recording a second image.

BRIEF DESCRIPTION OF THE DRAWINGS

Further objects, features, and advantages of the present invention will become apparent from the following detailed description taken in conjunction with the accompanying figures showing illustrative embodiments of the present invention, in which:

FIG. 3A is a diagram illustrating an exemplary, spatially-varying transmittance filter in accordance with the present invention;

FIG. 3B is a graph illustrating a spatially-varying optical characteristic of the filter illustrated in FIG. 3A;

FIG. 4A is a diagram illustrating an additional exemplary spatially-varying transmittance filter in accordance with the present invention;

FIG. 4B is a graph illustrating a spatially-varying optical characteristic of the filter illustrated in FIG. 4A;

FIG. 5A is a diagram illustrating an exemplary spatially-varying spectral filter in accordance with the present invention;

FIG. 5B is a graph illustrating a spatially-varying optical characteristic of the filter illustrated in FIG. 5A;

FIG. 12A is a diagram illustrating an exemplary system for recording images in accordance with the present invention;

FIG. 12B is a diagram illustrating an another exemplary system for recording images in accordance with the present invention;

FIG. 17 is a diagram illustrating a still further exemplary system for recording images in accordance with the present invention;

FIG. 18 is a diagram illustrating an additional exemplary system for recording images in accordance with the present invention;

FIG. 24 is a diagram illustrating another exemplary arrangement for moving an optical element in accordance with the present invention;

FIG. 25 is a graph illustrating the motion of an exemplary optical element in accordance with the present invention;

FIG. 28A is a graph illustrating an exemplary temporal variation of a spectral characteristic of an optical element in accordance with the present invention;

FIG. 28B is a graph illustrating another exemplary frame rate for recording images in accordance with the present invention;

FIG. 29 is a diagram illustrating another additional exemplary system for recording images in accordance with the present invention;

FIG. 30 is a graph illustrating an exemplary temporal variation of focus quality with respect to a particular image pixel in accordance with the present invention;

FIG. 31A is a graph illustrating an exemplary temporal dependence of horizontal deflection of an image in accordance with the present invention;

FIG. 31B is a graph illustrating an exemplary temporal dependence of vertical deflection of an image in accordance with the present invention;

FIG. 31C is a graph illustrating yet another exemplary frame rate for recording images in accordance with the present invention;

FIG. 32 is a diagram illustrating an exemplary spatial distribution of image data in accordance with the present invention;

FIG. 34A is a graph illustrating an exemplary temporal dependence of a spectral characteristic of an optical element in accordance with the present invention;

FIG. 34B is a graph illustrating an exemplary temporal dependence of a transmittance of an optical element in accordance with the present invention;

FIG. 34C is a graph illustrating still another exemplary frame rate for recording images in accordance with the present invention;

FIG. 35 is a graph illustrating an exemplary dependence of pixel brightness upon the polarization angle of a polarization filter in accordance with the present invention;

FIG. 36A is a graph illustrating an exemplary temporal dependence of a blur radius associated with a scene point imaged in accordance with the present invention;

FIG. 36B is a graph illustrating a further exemplary frame rate for recording images in accordance with the present invention.

Throughout the figures, unless otherwise stated, the same reference numerals and characters are used to denote like features, elements, components, or portions of the illustrated embodiments.

DETAILED DESCRIPTION OF THE INVENTION

Figure 2A:
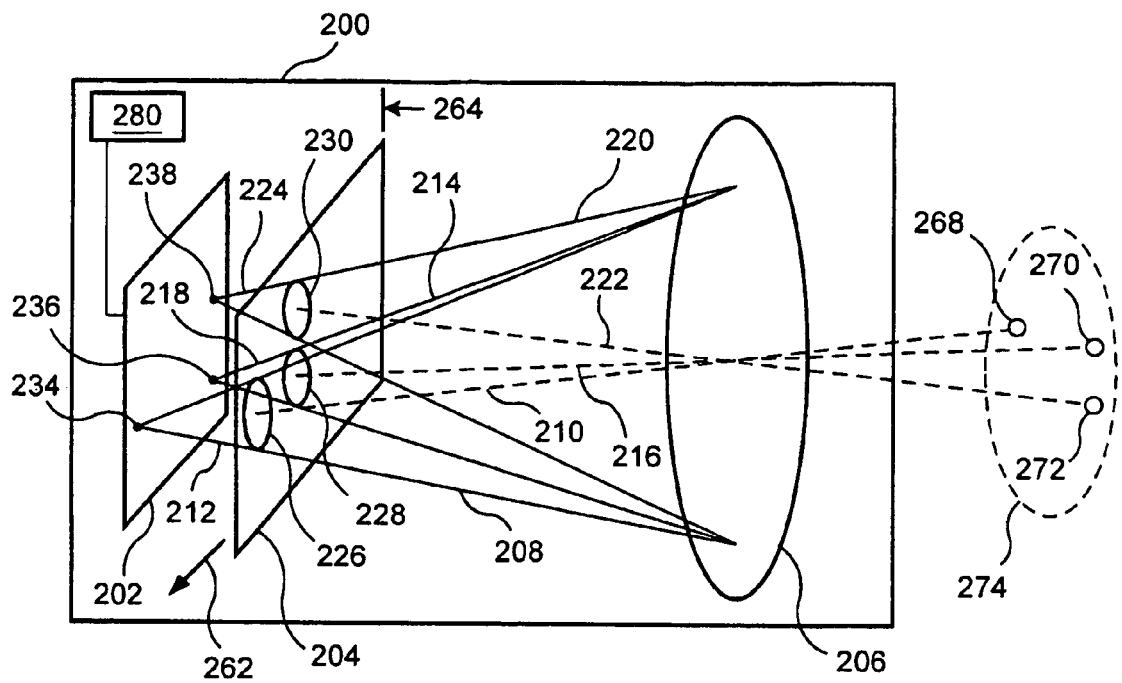
FIG. 2A is a diagram illustrating an exemplary system for recording images in accordance with the present invention.

FIG. 2A illustrates schematically an exemplary imager 200 for recording images in accordance with the present invention. The imager 200 includes a lens 206, an image detector 202, and an optical element 204 which can be moved in the reference frame of the imager 200. The optical element 204 is used to process incoming radiation rays (e.g., visible light rays, infrared rays, ultraviolet rays and/or other types of radiation rays), thereby producing processed rays which are received by the image detector 202. The image detector 202 measures the intensities of the processed rays in order to produce images. The image detector 202 is preferably an electronic detector such as a charge-coupled device (CCD) array. The imager 200 is operated by recording multiple images—i.e., a sequence of image frames—while moving the optical element 204 in the reference frame of the imager 200, as is described in further detail below.

In considering the imager 200 illustrated in FIG. 2A, it should be noted that, in an optical system which focuses incoming light rays or other radiation rays to form an image, the rays are typically thought of as being grouped in "bundles," each bundle including the radiation rays emanating from a particular scene point. As will be readily understood by those skilled in the art, the location and direction of a radiation ray bundle is typically defined by the "chief ray" of the bundle. In a radially symmetric optical system, the chief ray of each radiation ray bundle typically passes through the center of a lens into which, or from which, the radiation ray bundle is received.

In accordance with the present invention, the optical element 204 has an optical characteristic which varies across the optical element 204, thereby causing radiation ray bundles received by different portions of the optical element 204 to be processed differently. For example, the optical element 204 can be a transmittance filter or other radiation intensity reduction filter which reduces the intensity of radiation passing through the filter. An example of such a filter is illustrated in FIG. 3A. As is illustrated in FIG. 3B, the transmittance e of the filter 302 varies linearly as a function of position x across the filter 302, such that if a first radiation ray bundle strikes the left side of the filter 302, and a second radiation ray bundle strikes the right side of the filter 302, the respective intensities of the first and second ray bundles are reduced by different amounts.

The spatially varying optical element 204 can be located either between the lens 206 and the image detector 202, or on the other side of the lens 206. However, because radiation ray bundles are more tightly focused closer to the image detector 202, the optical element 204 is preferably located between the lens 206 and the image detector 202 in order to maximize the effects of the spatial variation and motion of the optical element 204 on the processing of radiation ray bundles received by different portions of the optical element 204—i.e., in order to maximize the spatial and temporal variation of the processing of the radiation ray bundles.

It is to be noted that, although the optical characteristic of the filter 302 illustrated in FIG. 3A varies smoothly as a function of position x across the filter, the optical characteristic of such filter—or, indeed, of any other optical element in accordance with the present invention—need not be a smoothly varying function. For example, as illustrated in FIGS. 4A and 4B, the optical characteristic of an optical element 204 (e.g., a radiation ray intensity reduction filter 402) can vary as a step-wise varying function of position x.

Figure 1:
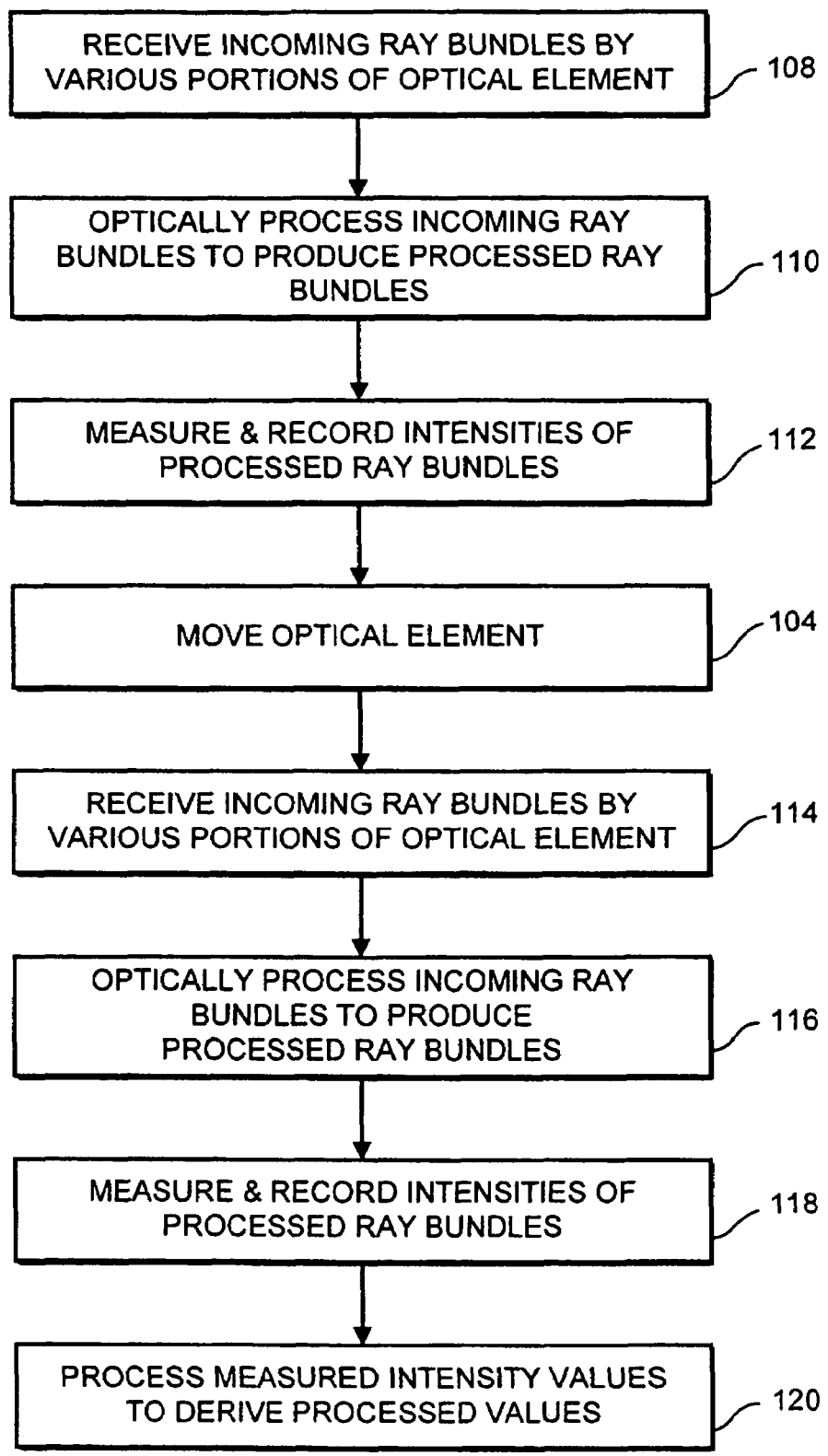
FIG. 1 is a flow diagram illustrating an exemplary procedure for recording images in accordance with the present invention.

FIG. 1 is a flow diagram illustrating an exemplary procedure for operating the imager 200 illustrated in FIG. 2A. In the procedure illustrated in FIG. 1 for using the imager 200 illustrated in FIG. 2A, a first image is recorded (steps 108, 110 and 112) while the optical element 204 is in a first position 264. In recording the first image (steps 108, 110 and 112), each radiation ray bundle coming from the lens 206 is received by a different portion of the optical element 204 (step 108). As a result, each radiation ray bundle is processed according to the optical characteristic(s) of the optical element portion receiving that particular ray bundle (step 110). For example, consider radiation ray bundles 208, 214, and 220 comprising radiation from, respectively, portions 268, 270, and 272 of a scene 274 being imaged. Radiation ray bundle 208 has a first chief ray 210 in the reference frame of the imager 200, and is therefore received and optically processed by a portion 226 of the optical element 204 to produce a processed radiation ray bundle 212 which is focused onto a first portion 234 of the image detector 202. Radiation ray bundle 214 has a different chief ray 216 in the reference frame of the imager 200, and is therefore received and processed by a different portion 228 of the optical element 204 to produce a processed radiation ray bundle 218 which is focused onto another portion 236 of the image detector 202. Radiation ray bundle 220 has yet another different chief ray 222 in the reference frame of the imager 200, and is therefore received and processed by yet another portion 230 of the optical element 204 to produce a processed radiation ray bundle 224 which is focused onto yet another portion 238 of the image detector 202. The image detector 202 detects the processed radiation ray bundles 212, 218, and 224 by measuring the respective intensities of these bundles 212, 218, and 224 and recording the measured intensities in a memory 280 (step 112), thus producing the first recorded image. The storage of image data in memory is well known in the art.

In order to image each portion of the scene under different conditions of imager sensitivity, the optical characteristic of each portion of the optical element 204 is preferably different from the optical characteristics of the portions having different locations in the direction in which the element 204 is moving. For example, optical element portion 226 has an optical characteristic which is different from those of portions 228 and 230. As a result, the optical element 204 processes radiation ray bundle 208 differently from radiation ray bundles 214 and 220.

After the first image has been recorded (steps 108, 110 and 112), the optical element 204 is moved into a second position 266 (step 104) such that each ray bundle which would have been received by a particular portion of the optical element 204 is now received by a different portion of the optical element 204. In the example illustrated in FIG. 2A, the optical element 204 is moved in a horizontal direction 262 in the reference frame of the imager 200. However, the optical element can, optionally, be moved in any direction in which its optical characteristics vary. Preferably, the motion of the optical element is continuous—i.e., the motion does not stop for any significant amount of time while images are being recorded.

Figure 2B:
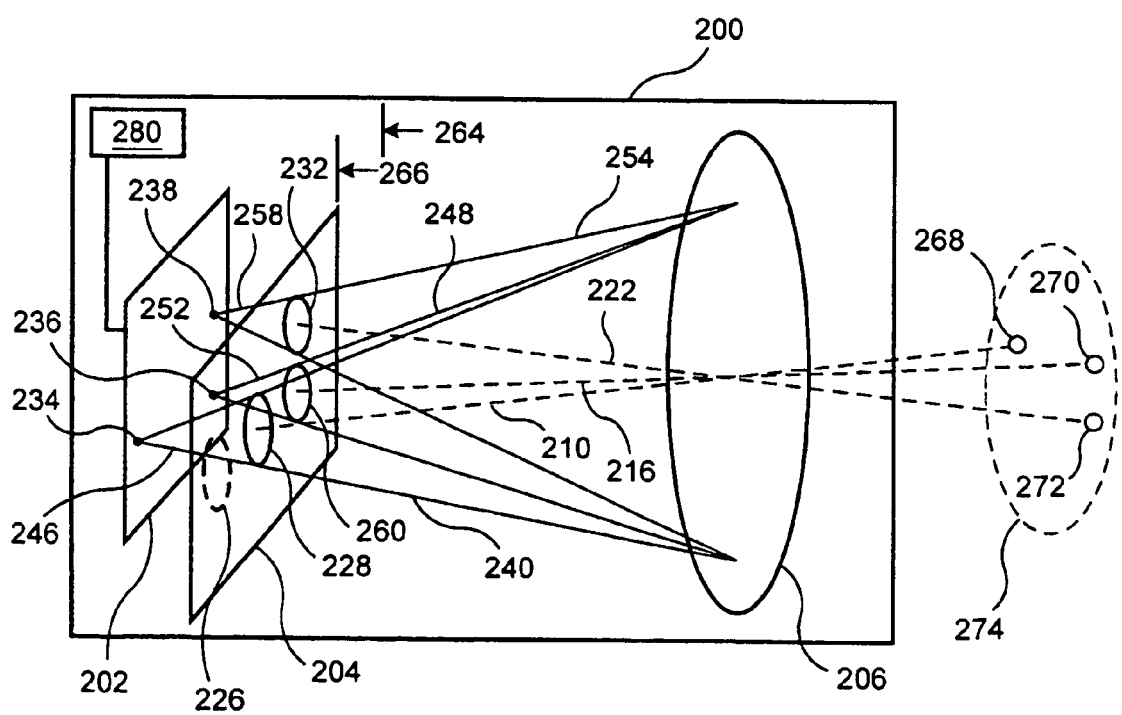
FIG. 2B is a diagram illustrating an additional configuration of the system illustrated in FIG. 2A.

In the example illustrated in FIG. 2B, a radiation ray bundle having chief ray 210—which would have been received by portion 226 of the optical element 204 if the optical element 204 were still in the first position 264—is instead received by a different portion 228 of the optical element 204. Similarly, a radiation ray bundle having chief ray 216, which would have previously been received by portion 228 of the optical element 204, is now received by a different portion 260 of the optical element 204. Likewise, a radiation ray bundle having chief ray 222, which would have previously been received by portion 230 of the optical element 204, is now received by portion 232 of the optical element 204. In each case, after the step of moving the optical element 204 (step 104), the optical element portion receiving a particular radiation ray bundle has an optical characteristic which is different from that of the optical element portion which would have received the radiation ray bundle if the optical element 204 had not moved. Furthermore, as discussed above, each portion of the optical element 204 has an optical characteristic which is preferably different from those of optical element portions having different locations in the direction of motion 262 of the optical element 204. For example, the optical characteristic(s) of optical element portion 228 is/are different from the optical characteristics of optical element portions 260 and 232.

Once the optical element 204 has been moved into the second position 266 (step 104), the second image is recorded (steps 114, 116, and 118). In recording the second image, incoming radiation ray bundles 240, 248, and 254—which have chief rays 210, 216, and 222, respectively, and comprise radiation from scene portions 268, 270, and 272, respectively—are received by the respective portions 228, 260, and 232 of the optical element 204 (step 114), which optically process the radiation ray bundles 240, 248, and 254 to produce processed radiation ray bundles 246, 252, and 258, respectively (step 116). The intensities of the respective processed radiation ray bundles 246, 252, and 258 are measured by the image detector 202 and recorded in the memory 280 (step 118).

As the imager 200 records a sequence of images, radiation ray bundles having a particular chief ray are processed by various portions of the optical element 204, each portion having a different optical characteristic. As a result, radiation (e.g., light) emanating from each scene point is effectively detected using a variety of imager sensitivity characteristics, thereby enabling the collection of information which would not have been available from an imager having static sensitivity characteristics. For example, suppose that the optically element 204 is a spatially varying intensity reduction filter such as one of the transmittance filters 302 and 402 illustrated in FIGS. 3A and 4A, respectively. A radiation ray bundle 208 having chief ray 210 is first processed by portion 226 of the filter 204 to generate a processed radiation ray bundle 212 which is detected by the image detector 202. Referring to FIG. 3B, if filter portion 226 has a position $x_1$, it will have a particular transmittance $e_1$—or equivalently, a particular intensity reduction factor $1/e_1$. The filter 204 is then moved so that radiation ray bundles having chief ray 210 are now received by a different portion 228 of the filter 204. If the different filter portion 228 has a different position $x_2$, it will also have a different transmittance $e_2$—or equivalently, a different intensity reduction factor $1/e_2$. A radiation ray bundle 240 having chief ray 210 is now received by the different portion 228 of the filter 204, to produce an attenuated radiation ray bundle 246 which is detected by portion 234 the image detector 202. If the scene point from which the radiation in ray bundles 208 and 240 emanated has not moved significantly with respect to the imager 200, then the imager 200 has now recorded, under two different levels of imager sensitivity, information regarding the intensity of the radiation emanating from the particular scene point. Similarly, although radiation ray bundles 214 and 248 have the same chief ray 216, the intensities of ray bundles 214 and 248 are reduced by different intensity reduction factors, because the filter 204 has moved (step 104) between the steps recording the first and second images (steps 108, 110 and 112, and steps 114, 116 and 118 in FIG. 1). Likewise, although radiation ray bundles 220 and 254 have the same chief ray 222, the intensities of ray bundles 220 and 254 are reduced by different intensity reduction factors. By repeatedly recording images of the scene as the optical element 204 moves, each portion of the scene is imaged at a variety of different levels of imager sensitivity. As a result, the effective dynamic range of the imager is enhanced because, for each scene point, the image data includes brightness information recorded at both high sensitivity and low sensitivity. For example, relatively dim scene points (e.g., scene points whose recorded brightnesses are below a selected threshold) have been imaged under both high and low sensitivity; the high and low sensitivity data are processed (step 120 of FIG. 1) by selecting the high sensitivity data to be included in a final, fused image. Similarly, relatively bright scene points (e.g., scene points whose recorded brightnesses are above the aforementioned threshold or a different threshold) have been imaged under both high and low sensitivities; the high and low sensitivity data are processed (step 120 of FIG. 1) by selecting the low sensitivity data to be included in the fused image. In the resulting, fused image, both dim scene points and bright scene points are thus properly exposed, with high brightness resolution and little or no saturation.

Figure 22:
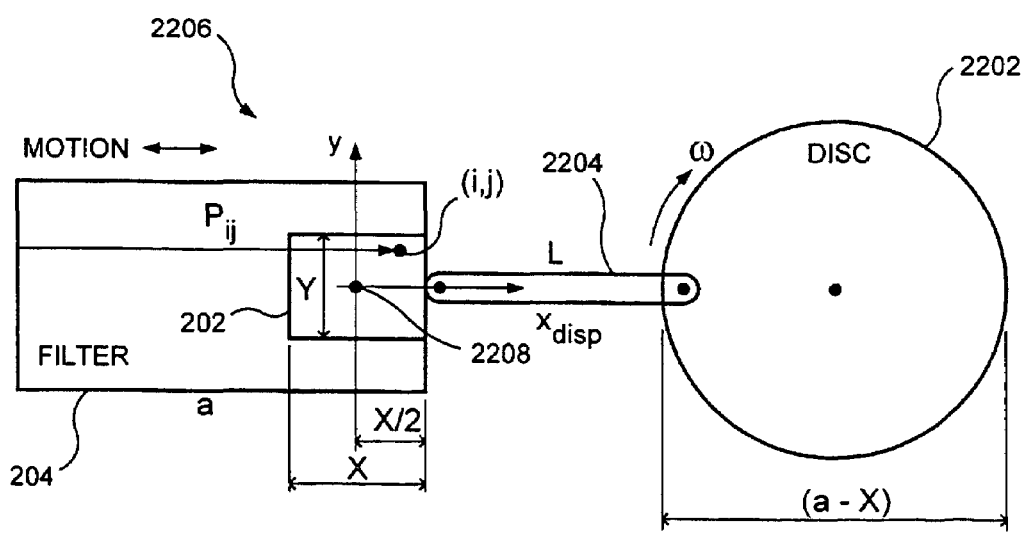
FIG. 22 is a diagram illustrating an exemplary arrangement for moving an optical element in accordance with the present invention.

The benefits of including a moving, spatially varying filter in an imager can be further understood with reference to the following example, in which a linearly varying, wavelength-neutral density filter—such as the filter 302 illustrated in FIG. 3A—is smoothly translated back and forth in an oscillating motion. One exemplary optical element driver for producing such a motion is the crank arrangement 2206 illustrated in FIG. 22. Referring to FIG. 22, in the illustrated arrangement 2206, the filter 204 being moved has a length α, and the image detector 202 has a width X and a height Y. The filter 204, but not the image detector 202, is linked, via a mechanical linkage 2204 having a length L, to a rotating disc 2202 having a diameter α–X. If the disc 2202 is rotated at a uniform angular velocity ω, the time period T of a single cycle of rotation equals ω/2π. Using basic geometric principles, and a coordinate system referenced to the center 2208 of the image detector 202, the linear displacement $X_{disp}(t)$ of the filter 204 at time t can easily be determined based on the respective sizes and geometries of the mechanical components used in the optical element driver.

Using $X_{disp}(t)$, it is possible to determine the location $p_{ij}$ on the filter 204 which overlaps a pixel (i,j) of the image detector 202 at time t:

$$p_{ij}(t) = \left(a - \frac{X}{2} + i\right) - X_{disp}(t) \tag{1}$$

Figure 23A:
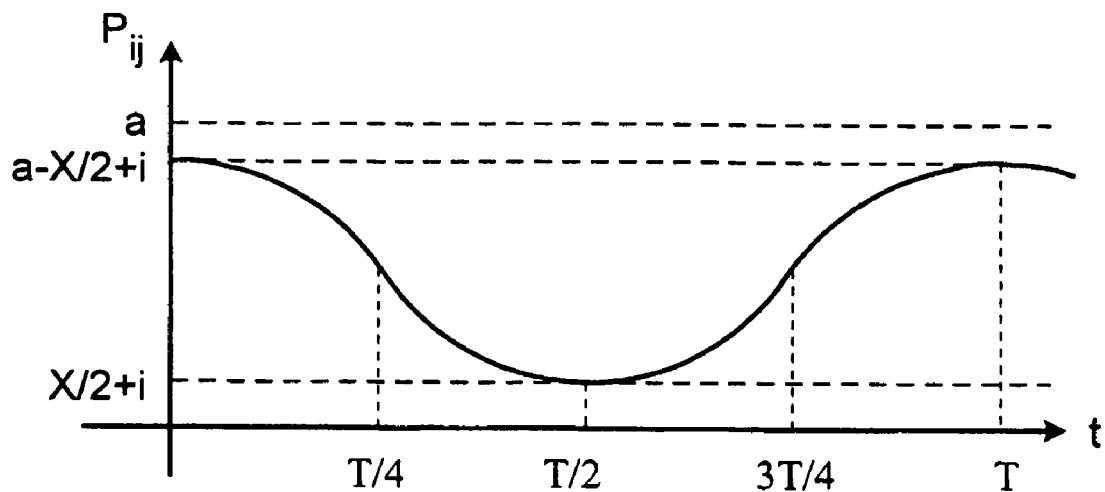
FIG. 23A is a graph illustrating the motion of an exemplary optical element in accordance with the present invention.

In FIG. 23A, position $p_{ij}$ is plotted as a function of time. As can be seen from the drawing, the position $p_{ij}$ varies sinusoidally between minimum and maximum values X/2+i and α–X/2+i. Provided that the filters optical characteristic—e.g., its intensity reduction factor—is a known function of position $p_{ij}$, Eq. 2 can readily be used to determine how each radiation ray and/or ray bundle is processed at time t.

Figure 23B:
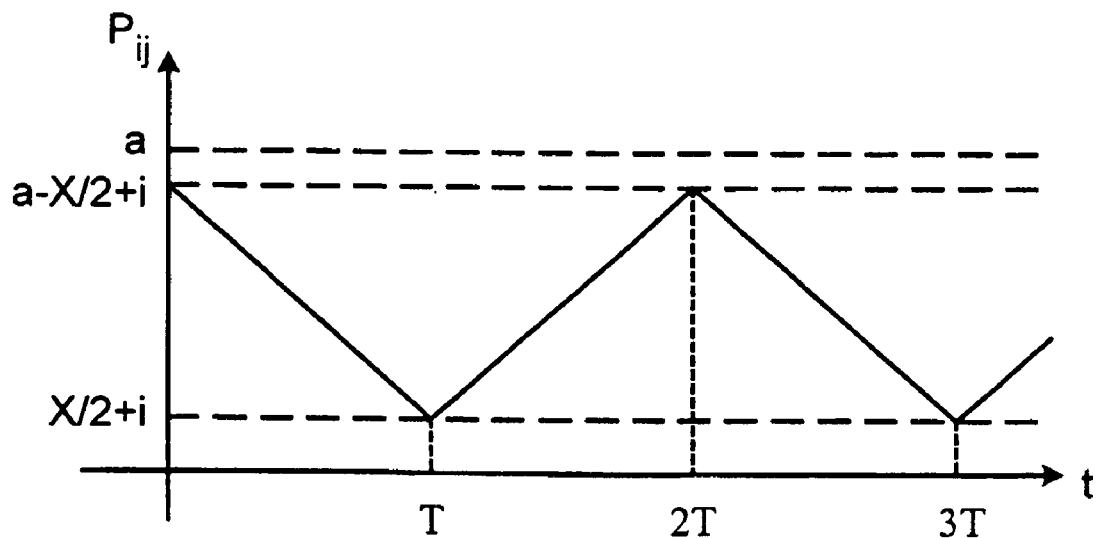
FIG. 23B is a graph illustrating the motion of an additional exemplary optical element in accordance with the present invention.

Instead of the crank arrangement 2206 described above, the optical element driver can be a conventional, linear, reciprocating motor having approximately constantly constant speed during each stroke of its reciprocating motion. Such a motor can be used to directly drive the filter 204 back and forth such that the filter's velocity is constant during each stroke of the motor. FIG. 23B illustrates the time-dependent position function $p_{ij}$ associated with such a reciprocating, linear motor arrangement.

Figure 26A:
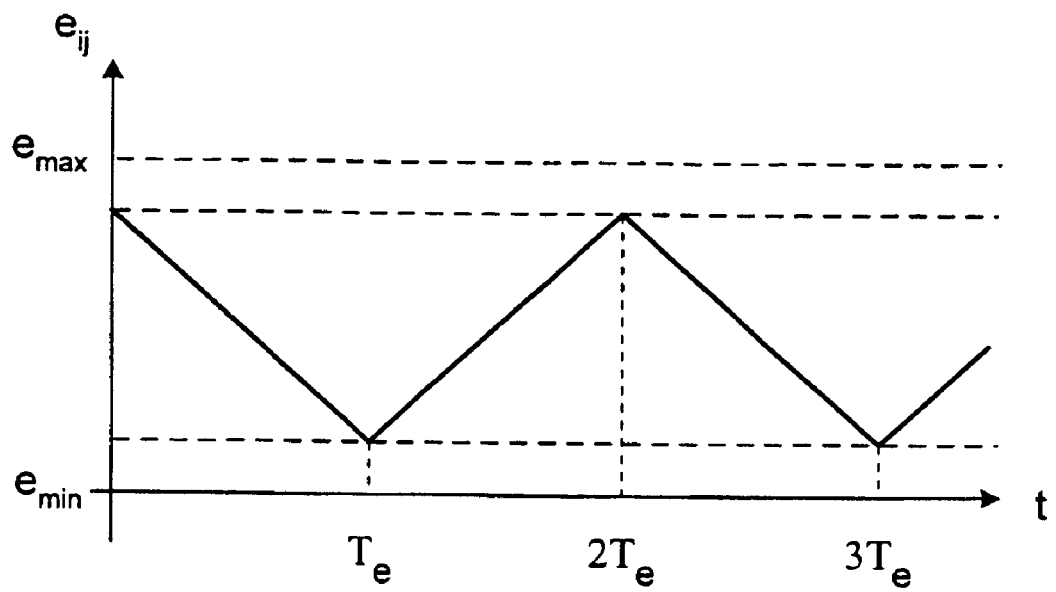
FIG. 26A is a graph illustrating an exemplary temporal variation of transmittance of an optical element with respect to an image pixel in accordance with the present invention.
Figure 26B:
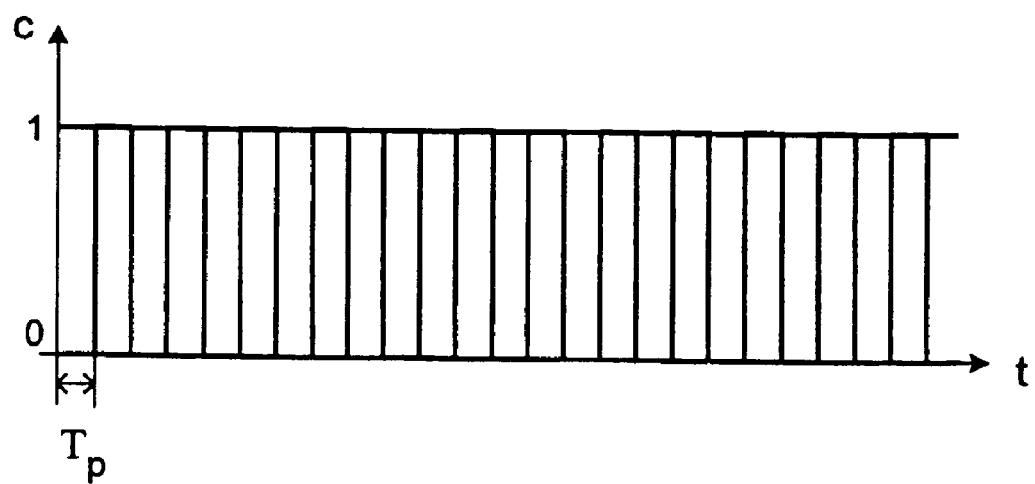
FIG. 26B is a graph illustrating an exemplary frame rate for recording images in accordance with the present invention.

Now consider an imager 200 in which the optical element 204 is the linearly varying, wavelength-neutral density filter 302 illustrated in FIG. 3A, and in which this filter 302 is translated back and forth at a constant linear velocity v such that the filter position function $p_{ij}$ associated with a given pixel (i,j) has the time dependence illustrated in FIG. 23B. The time $T_e$ it takes for the filter to complete a full translation in one direction (i.e., half of a complete cycle of its motion) is $T_e=(α–X)/v$. If the filter 302 has the transmittance function e illustrated in FIG. 3B, then the position function $p_{ij}$ illustrated in FIG. 23B results in the exposure $e_{ij}$ of a pixel (i,j) varying as illustrated in FIG. 26A. Now, let the frame rate of the image detector 202 be $f=1/T_p$ frames per second. In the case of a progressive scan detector, this corresponds to a pixel integration time of $T_p$, as is illustrated in FIG. 26B. The effective exposure of the pixel (i,j) in any given frame is the average of the exposures of the filter portions that move over the corresponding portion of the detector 202 during $T_p$. Therefore, the brightness $$B_{ij}^{(n)}$$

at the pixel (i, j) in the $n^{th}$ frame can be expressed as:

$$B_{ij}^{(n)} = k \int_{(n-1)T_p}^{nT_p} \int_{\lambda_{max}}^{\lambda_{max}} e_{ij}(t) E_{ij}(\lambda, t) s(\lambda) d\lambda dt, \tag{2}$$

where $E_{ij}$ is the image irradiance at the pixel corresponding to the radiance of the scene portion being imaged at pixel (i,j), s(λ) is the spectral response of the pixel (i,j) as a function of wavelength λ, and $\lambda_{min}$ and $\lambda_{max}$ are the lower and upper limits of the spectral response of the detector with respect to the pixel (i,j). The constant k represents the "gain" of the detector with respect to the pixel. If the scene radiance is approximately constant during the scanning process, then:

$$B_{ij}^{(n)} = k \int_{(n-1)T_p}^{nT_p} e_{ij}(t) dt \int_{\lambda_{min}}^{\lambda_{max}} E_{ij}(\lambda) s(\lambda) d\lambda \text{ and} \tag{3}$$

$$B_{ij}^{(n)} = k e_{ij}^{(n)} \int_{\lambda_{min}}^{\lambda_{max}} E_{ij}(\lambda) s(\lambda) d\lambda \tag{4}$$

where $e^{(n)}_{ij}$ is the effective exposure of the pixel in the $n^{th}$ frame.

As an approximation, it can be assumed that the radiometric response function of the image detector is linear within a certain range. In other words, within that range, the response of a detector pixel increases approximately linearly with respect to the intensity of radiation impinging on the detector pixel. However, in practice, a typical image detector has a finite number (e.g., 255) of discrete quantization levels, and also has an upper limit on the brightness it can measure. As a result, the detector maps the pixel brightness $B^{(n)}_{ij}$ to a measured brightness $M^{(n)}_{ij}$, where $0 \leq M^{(n)}_{ij} \leq M_{max}$.

Figure 27A:
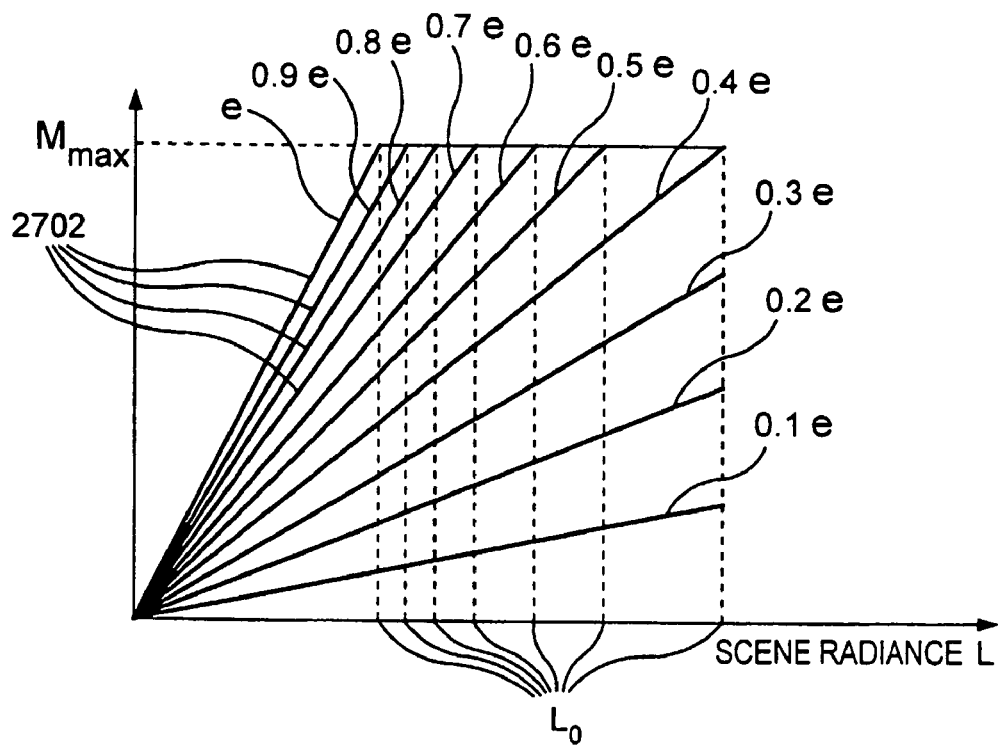
FIG. 27A is a graph illustrating exemplary effective sensitivity characteristics of an imager in accordance with the present invention.

Changing the exposure of a detector pixel is equivalent to scaling the radiometric response function of that pixel. For example, as is illustrated in FIG. 27A, reducing the exposure e reduces the slope of the response function 2702, which has the additional effect of increasing the scene radiance $L_o$ at which the detector element saturates—i.e., the scene radiance $L_o$ at which the detector element's output signal M reaches its maximum value $M_{max}$. Once the pixel brightnesses are measured under different exposures e, a precise value of the irradiance of the light received from the corresponding scene portion can be computed in one of a number of different ways. For example, the processing step (step 120 in FIG. 1) can comprise adding the measured brightnesses to produce a "fused" pixel value $\tilde{M}_{ij}$:

$$\tilde{M}_{ij} = \sum_{n=1}^{n=N} M_{ij}^{(n)} \tag{5}$$

Figure 27B:
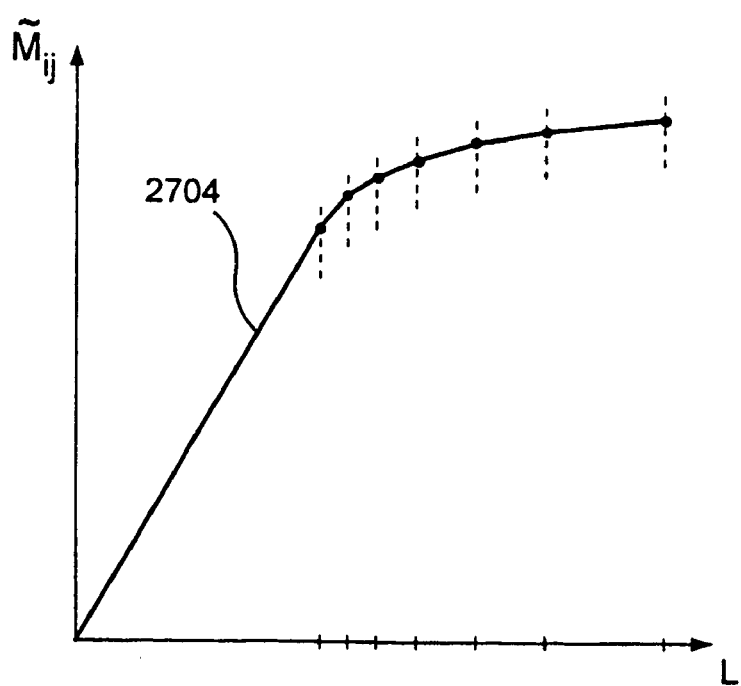
FIG. 27B is a graph illustrating an additional exemplary effective sensitivity characteristic of an imager in accordance with the present invention.

The resulting set of pixel values forms a "fused" image having greatly enhanced dynamic range. As is illustrated in FIG. 27B, the image data are related to a scene radiance L based on a piecewise linear response function 2704 having a shape which can be approximated by a "gamma" (i.e., power law) function $M_{app.}=\beta\Gamma$. The values γ and β can be easily computed based on: (1) the exposure values of the different portions of the filter; (2) the speed of movement of the filter; and (3) the number of images recorded to form the fused image. Since the parameters γ and β of the approximate gamma function $M_{app.}$ are known, the computed image can be remapped—using, e.g., the function $M_{app.}$ and/or a look up table (LUT)—to produce an image having a linear response function. Such a linear image is preferable for most applications.

An additional method for computing a high-dynamic-range, fused image (step 120 in FIG. 1) is to discard all measured brightness values which are either saturated (i.e., above a selected threshold) or too low in value (i.e., below that threshold or a different threshold). The remaining brightness values are then normalized according to their corresponding exposures, so that all of the normalized brightness values are based on the same function of image irradiance. A weighted average of these normalized brightness values yields a good estimate of image irradiance. The respective weights used for averaging the normalized values are preferably chosen so as to minimize the effects of noise. For example, lower measured brightness values are preferably given lower weights, because they typically have lower signal-to-noise ratios.

Figure 8A:
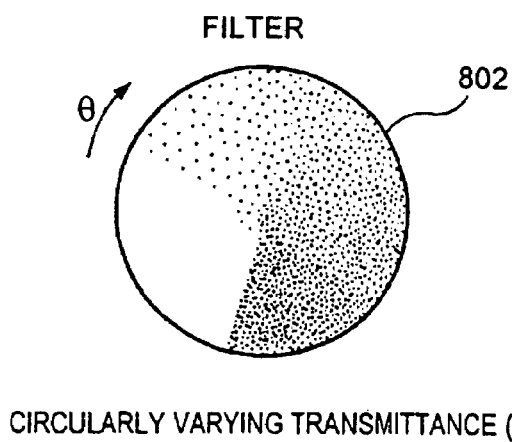
FIG. 8A is a diagram illustrating an exemplary spatially-varying transmittance filter in accordance with the present invention.
Figure 8B:
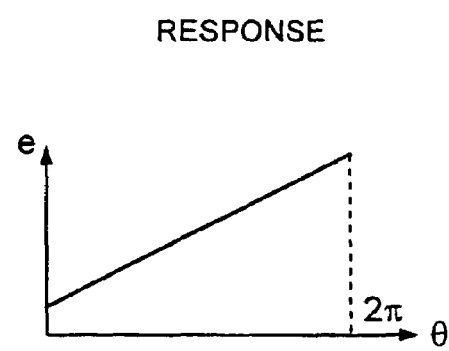
FIG. 8B is a graph illustrating a spatially-varying optical characteristic of the filter illustrated in FIG. 8A.

Now consider a rotating filter such as the disk filter 802 in FIGS. 8A and 24. The illustrated filter 802 has a transmittance e which is radially constant, but varies with azimuthal, angular location θ around the filter 802. Assuming that the filter has a constant angular velocity ω, the position function depends only on the angular location $\phi_{ij}$ of the detector pixel (i,j) with respect to the filter. At t=0, this angle $\phi_{ij}$ is:

$$\phi_{ij}(t) = \tan^{-1}\frac{j}{(R_0 - i)} \quad (6)$$

where $R_o$ is the distance between the center 2402 (shown in FIG. 24) of the filter 802 and the origin 2208, and i and j are the coordinates of the pixel (i,j). At any time t during the rotation, the angular position $\phi_{ij}$ of the pixel with respect to the filter 802 is:

$$\theta_{ij}(t)=\omega t-\phi_{ij} \quad (7)$$

FIG. 25 illustrates how this angular position $\phi_{ij}$ varies as a saw-tooth function of time t.

A similar technique can be used to enhance the spectral (e.g., color) resolution of an imager—i.e., to provide additional information regarding the spectral properties of incoming radiation rays. Conventional color cameras typically can resolve only three colors: red, green, and blue (R, G, and B). Such spectral resolution is far too limited for many real world applications. For example, detection, segmentation, and recognition of objects can require a much richer description of the spectral characteristics of scene points. In conventional systems, this need has been addressed by using very expensive multispectral and hyperspectral cameras. However, the costs of such cameras and their associated components are prohibitive for many applications. In contrast, the moving-filter methods of the present invention provide a very cost-effective and efficient way to acquire multispectral images. For example, consider an imager 200 such as is illustrated in FIGS. 2A and 2B, in which the moving optical element 204 is a spectral filter such as an interference filter. An example of such a filter 502 is illustrated in FIG. 5A.

Figure 9:
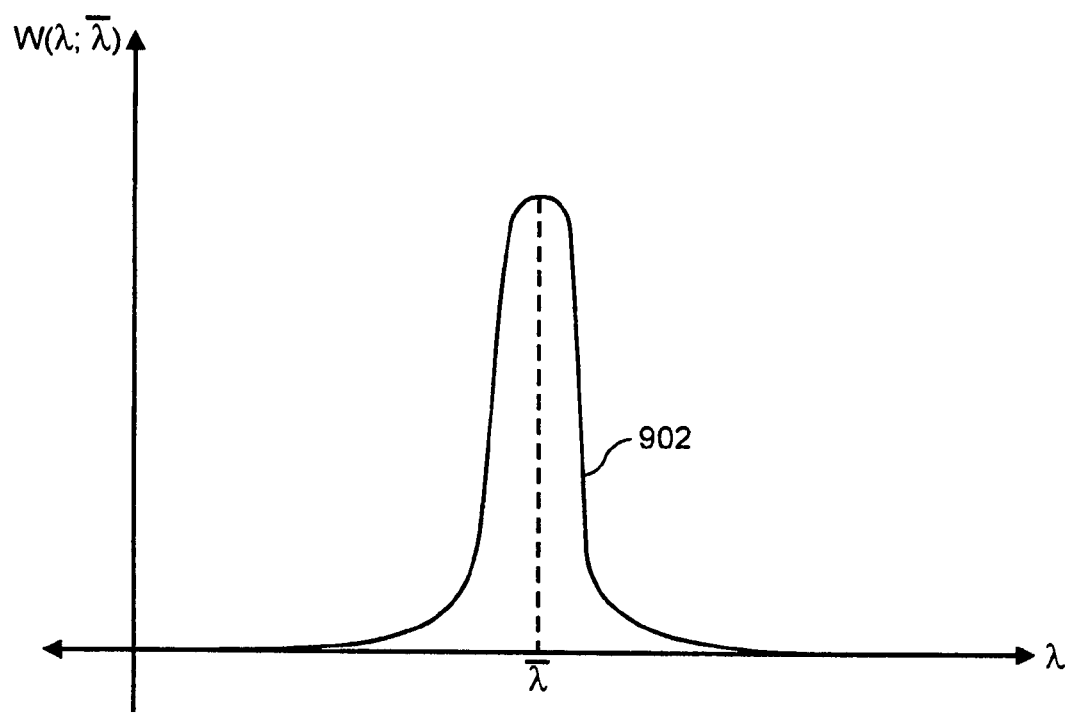
FIG. 9 is a graph illustrating a spectral filtering characteristic of an exemplary spectral filter in accordance with the present invention.

The illustrated spectral filter 502 has a spectral filtering characteristic which varies as a function of position x across the filter 502. Typically, the spectral filter 502 is a bandpass filter, a high-pass filter, or a low-pass filter. For example, FIG. 9 illustrates a spectral filtering characteristic—in this case, a bandpass filtering function 902—which can vary with position across a spectral filter such as the filter 502 illustrated in FIG. 5A. The exemplary bandpass filtering function 902 represents the transmittance W of the filter 502 as a function of the wavelength λ of the radiation being processed by the filter 502. Such a bandpass function 902 typically has a mean wavelength $\bar{\lambda}$.

Figure 10:
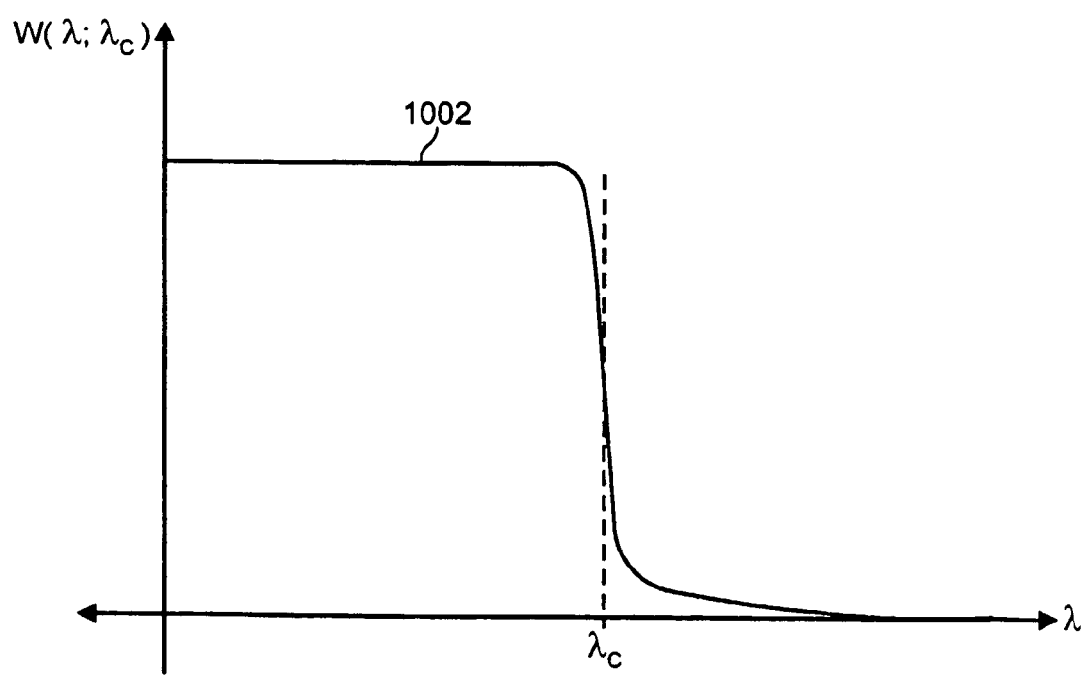
FIG. 10 is a graph illustrating a spectral filtering characteristic of an additional, exemplary spectral filter in accordance with the present invention.

In addition, as is illustrated in FIG. 10, the spectral filtering characteristic of a filter 502 can be a high-pass function 1002 having a cutoff wavelength $\lambda_c$. A high-pass filter having such a characteristic 1002 suppresses low-frequency radiation—i.e., radiation having a low photon energy and, correspondingly, a long wavelength—and does not suppress high-frequency radiation—i.e., radiation having a high photon energy and, correspondingly, a short wavelength.

Figure 11:
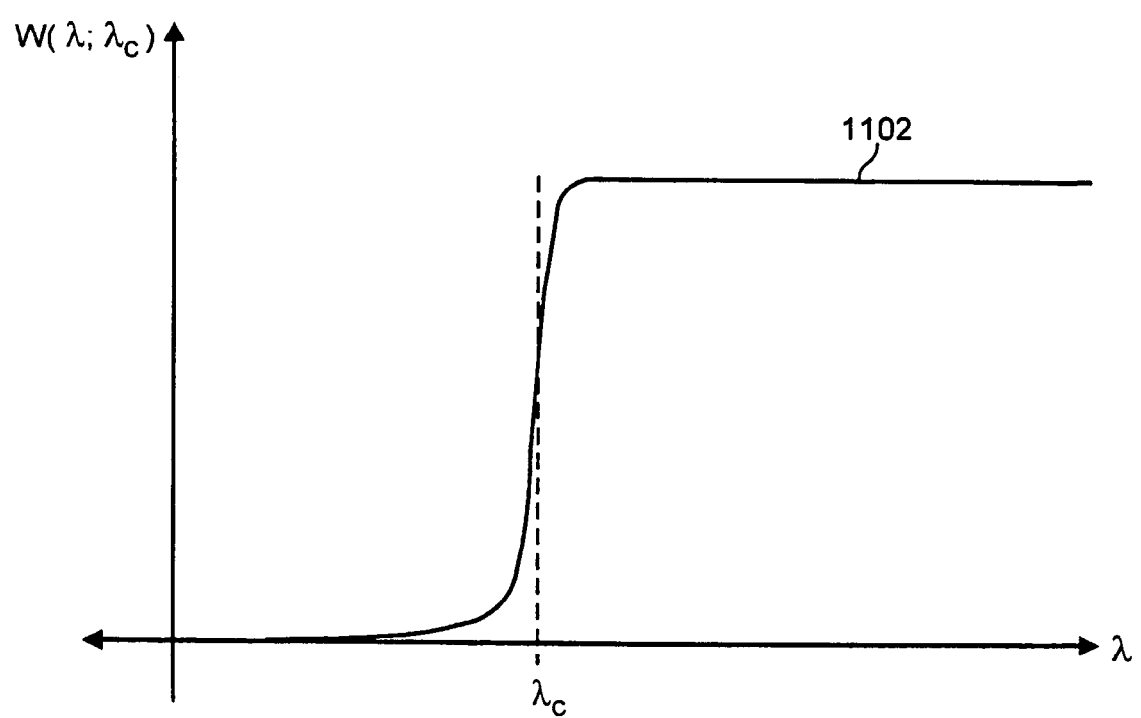
FIG. 11 is a graph illustrating a spectral filtering characteristic of yet another exemplary spectral filter in accordance with the present invention.

Furthermore, as is illustrated in FIG. 11, the spectral filtering characteristic of a filter 502 can be a low-pass function 1102 having a cutoff wavelength $\lambda_c$. A low-pass filter having such a characteristic 1102 suppresses high-frequency radiation—i.e., radiation having a high photon energy and, correspondingly, a short wavelength—and does not suppress low-frequency radiation—i.e., radiation having a low photon energy and, correspondingly, a long wavelength.

Returning now to the case of a bandpass filter, each point (i,j) on the filter 502 has a particular spectral filtering characteristic—such as, for example, the response function 902 illustrated in FIG. 9—which has a narrow peak and a mean wavelength $\bar{\lambda}_{ij}$. The response function W at a particular point (i,j) on the filter can be expressed as $W(\lambda;\bar{\lambda}_{ij})$. The mean wavelength $\bar{\lambda}_{ij}$ varies smoothly across the length of the interference filter. Such a filter can be implemented, for example, as a spatially varying interference filter.

As is discussed above with respect to FIGS. 1, 2A, and 2B, the optical element 204—in this case, spectral filter 502—is in a first position 264 during the recording of the first image (steps 108, 110 and 112 of FIG. 1), and a second position 266 during the recording of the second image (steps 114, 116 and 118 of FIG. 1). Therefore, although radiation ray bundles 208 and 240 have the same chief ray 210, these ray bundles 208 and 240 are spectrally filtered according to the different spectral filtering characteristics of filter portions 226 and 228, respectively, to produce differently processed radiation ray bundles 212 and 246, respectively. Similarly, although radiation ray bundles 214 and 248 have the same chief ray 216, these ray bundles 214 and 248 are spectrally filtered according to the different spectral filtering characteristics of filter portions 228 and 260, respectively, to produce differently processed radiation ray bundles 218 and 252, respectively. Likewise, although radiation ray bundles 220 and 254 have the same chief ray 222, these ray bundles 220 and 254 are spectrally filtered according to the different spectral filtering characteristics of filter portions 230 and 232, respectively, to produce differently processed radiation ray bundles 224 and 258, respectively.

The filter 502 of FIG. 5A can, for example, be translated in the reference frame of the imager 200 using the scanning mechanism discussed above with respect to FIG. 22, or can be moved at a fixed speed using a reciprocating, linear motor, as is discussed above with respect to FIG. 23B. In any case, the filter 502 is preferably moved continuously—i.e., without stopping for any significant amount of time while images are being recorded.

Regardless of the method used to move the filter 502 in the imager's reference frame, a sequence of images is recorded as the filter is moved, thereby providing a spectrally dense set of measurements of the radiation emanating from each scene point. Because each sample is a measurement of the intensity of a radiation ray containing radiation from a particular scene point, each sample corresponds to an integration of the radiance of that scene point over a narrow spectral band. For example, if constant-velocity translation is used, the mean wavelength $\bar{\lambda}$ of the radiation to which a pixel is exposed varies linearly within each full translation (i.e., half cycle of motion), as is illustrated in FIG. 28A. In this example, the pixel brightness in the $n^{th}$ frame of the captured sequence is:

$$B_{ij}^{(n)} = k \int_{(n-1)T_p}^{nT_p} \int_{\bar{\lambda}(t)-\lambda_w}^{\bar{\lambda}(t)-\lambda_w} W(\lambda; \bar{\lambda}_{ij}(t)) E_{ij}(\lambda, t) s(\lambda) d\lambda dt \quad (8)$$

Similarly to the imager 200 discussed above, which included a neutral density filter 302 (shown in FIG. 3A), in an imager 200 including a spectral filter 502, the image detector 202 maps each pixel brightness to a quantized and bounded measured brightness $M^{(n)}_{ij}$. If N frames are recorded, there are N measured brightness values for each pixel. These values can be interpolated (in the processing step 120 illustrated in FIG. 1) in order to derive an approximation of the continuous spectrum of a scene point. Alternatively, or in addition, the values can be viewed as a vector in a high-dimensional color space—i.e., a color space which is much more descriptive than the conventional R, G, B space—and used for a variety of image analysis tasks. It is to be noted that the multispectral imaging methods of the present invention are not restricted to the visible light spectrum, but can include detecting and resolving spectral components having wavelengths which extend far beyond the visible spectrum. For example, the measured spectral vector can include ultraviolet components, infrared components, and any other type of radiation components. Furthermore, the multispectral imaging methods of the present invention are not restricted to any particular type of spectral filter. For example, such methods can employ a continuously varying spectral filter—such as the filter 502 illustrated in FIG. 5A—and/or can employ a filter having a piecewise constant spectral characteristic—e.g., a spectral filter comprising two or more discrete spectral filter portions. In addition, a bandpass filter portion in accordance with the present invention need not have a single passband, but can have multiple passbands, wherein the characteristic(s) (e.g., the mean wavelength) of each passband can vary continuously across the filter, or can vary in a step-wise or other manner.

Furthermore, although the above discussion of spectral resolution enhancement has emphasized bandpass filtering—in which each portion of the spectral filter 502 (e.g., portions 226, 228, 230, 260, and 232 illustrated in FIGS. 2A and 2B) has its own bandpass characteristic—the spectral filter 502 can also be a low-pass filter, a high-pass filter, or a combination of low-pass filter portions, high-pass filter portions, and/or bandpass filter portions. For example, each filter portion (e.g., portions 226, 228, 230, 260, and 232) can have its own low-pass characteristic such as the low-pass characteristic 1102 illustrated in FIG. 11, or its own high-pass characteristic such as the high-pass characteristic 1002 illustrated in FIG. 10.

Figure 19A:
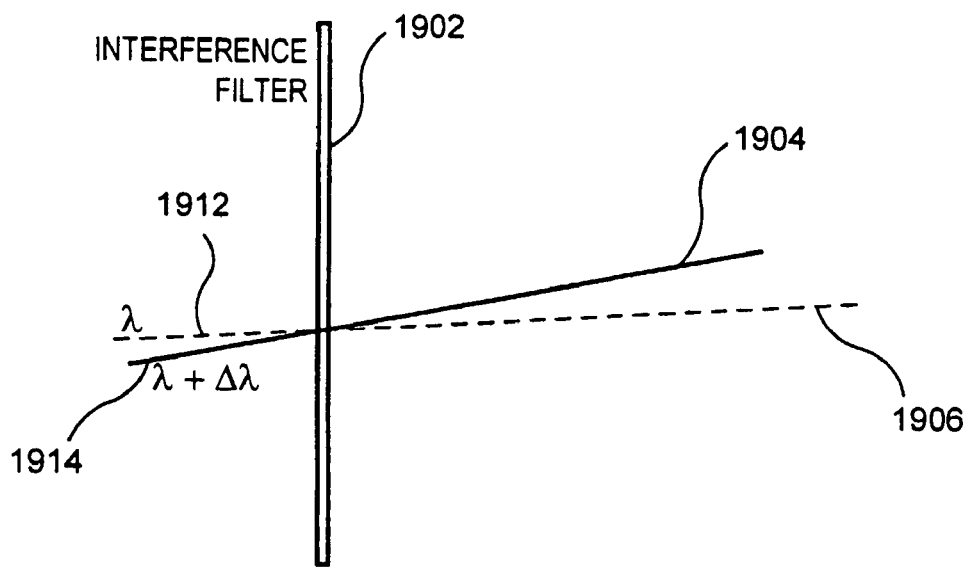
FIG. 19A is a diagram illustrating an exemplary interference filter in accordance with the present invention.

In addition, although the above discussion has emphasized the translation or rotation of an optical element such as a filter, the effective spectral characteristics of an interference filter can be adjusted by tilting the filter—i.e., by rotating the filter around an axis in the plane of the filter. As is illustrated in FIG. 19A, processing a radiation ray 1906 using an interference filter 1902 will produce a filtered radiation ray 1912. The characteristics with which the interference filter 1902 processes the incoming the radiation ray 1906 depend upon the angle at which the incoming radiation ray 1906 is incident on the interference filter 1902. For example, the filter 1902 may have, with respect to the incoming ray 1906, a bandpass characteristic having a mean wavelength $\lambda$. If a different incoming radiation ray 1904 strikes the filter 1902 at an angle different from that of the first radiation ray 1906, the filter 1902 will process the second incoming radiation ray 1904 according to a different spectral characteristics—e.g., a bandpass characteristic having a different mean wavelength $\lambda+\Delta\lambda$. The processed radiation ray 1914 derived from the second incoming radiation ray 1904 has thus been filtered differently from the processed radiation ray 1912 derived from the first incoming radiation ray 1906.

In accordance with the present invention, the angular dependence of the optical characteristics of an interference filter 1902 can be used to adjust the processing of incoming radiation rays and/or ray bundles. For example, in the imager 200 illustrated in FIG. 19B, the interference filter 1902 is rotated in a particular direction of rotation 1908, such that the processing of incoming radiation ray bundles 1916 depends upon the orientation of the interference filter 1902 at the time that the incoming radiation ray bundles 1916 are received. The resulting, processed radiation ray bundles 1910 are then detected by respective detector elements 1702 in the image detector 202. Each frame recorded by the image detector 202 has been captured with the interference filter 1902 in a different orientation, thereby enabling a wide range of wavelengths to be sampled. In addition, the interference filter can have spatially varying characteristics and can be scanned by translating, rotating, and/or tilting the filter 1902.

It is to be noted that tilting a filter into which a radiation ray bundle is received tends to change the amount of deflection of the ray bundle, thereby shifting the location on the image detector at which the ray bundle is directed. Accordingly, the data received using a filter-tilting technique should preferably be processed further in order to compensate for this shift in location. For example, using the known geometric characteristics of the imager, and the known orientation of the interference filter 1902 during each frame, the data should be registered—i.e., vertically and/or horizontally shifted—to cancel out the vertical and/or horizontal shift(s) caused by the changing tilt of the interference filter 1902.

Figure 19B:
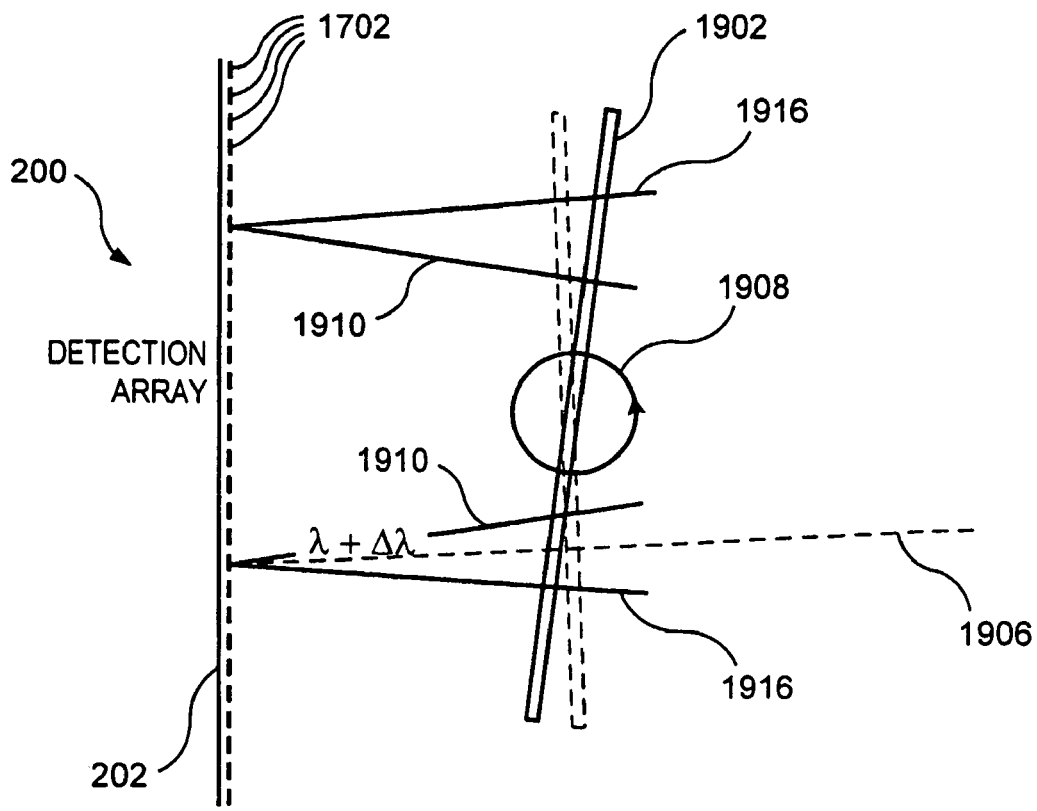
FIG. 19B is a diagram illustrating a yet further exemplary system for recording images in accordance with the present invention.
Figure 20:
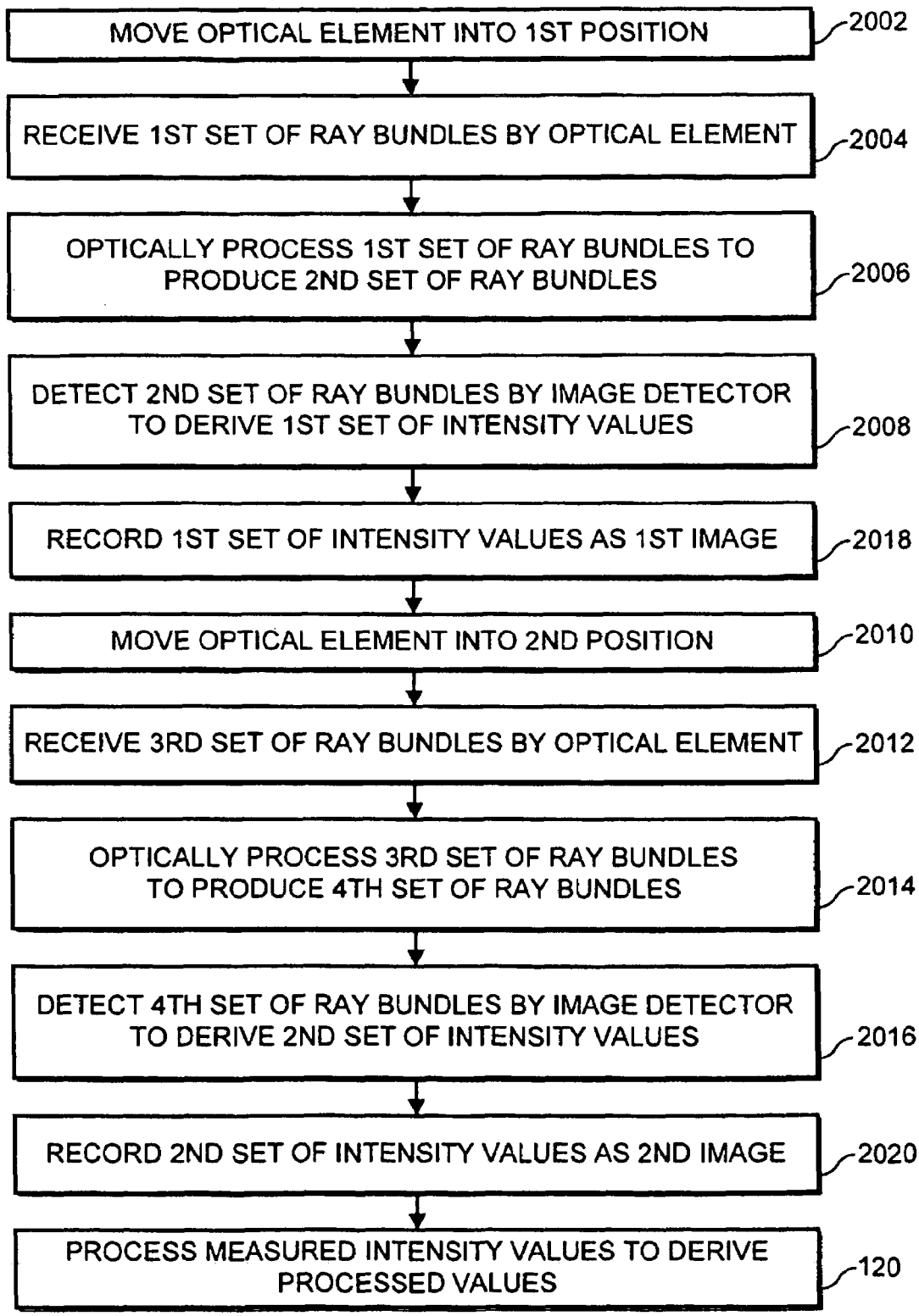
FIG. 20 is a flow diagram illustrating another exemplary procedure for recording images in accordance with the present invention.
Figure 21:
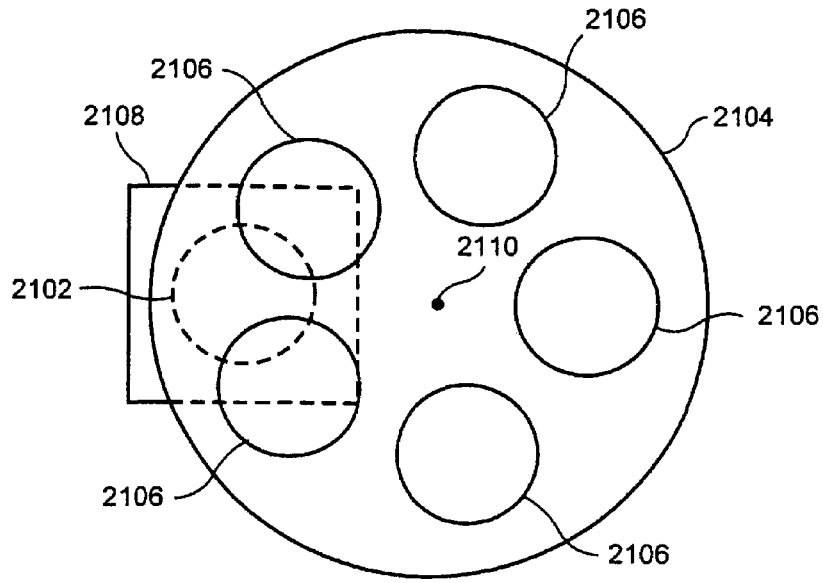
FIG. 21 is a diagram illustrating an exemplary prior art system for recording images.

FIG. 20 illustrates an exemplary procedure for operating the imager 200 illustrated in FIG. 19B. In the illustrated procedure, the interference filter 1902 is moved into a first position (step 2002). A first set of radiation ray bundles is received by the filter 1902 (step 2004). The first set of radiation ray bundles is spectrally filtered to produce a second set of radiation ray bundles (step 2006). The second set of ray bundles is detected by the image detector 202 to derive a first set of intensity values (step 2008). The first set of intensity values is recorded as a first image (step 2018). The filter 1902 is then moved into a second position (step 2010), in which the filter 1902 receives a third set of radiation ray bundles (step 2012). The filter 1902 filters the third set of radiation ray bundles to produce a fourth set of radiation ray bundles (step 2014). The fourth set of radiation ray bundles is detected by the image detector 202 to derive a second set of intensity values (step 2016). The second set of intensity values is recorded as a second image (step 2020). The measured intensity values in the first and second images are processed (step 120) to derive processed intensity values, using the fusion procedure discussed above. The resulting, first fused image has extra wavelength channels—i.e., enhanced spectral resolution compared to the first and second images.

In accordance with an additional aspect of the present invention, a moving, spatially varying polarization filter can be used to enable an imager to measure the polarization states of radiation ray bundles received from a scene. It is well known that the polarization of reflected light can be used for applications, such as: (1) determining whether a material is a dielectric or a metal; (2) removing specular reflections; and (3) determining the direction of illumination. In conventional systems polarization data is typically captured by rotating a polarization filter in front of the lens of the imaging system. Moving a spatially varying polarization filter in accordance with the present invention provides an improved method for acquiring this information.

Figure 6A:
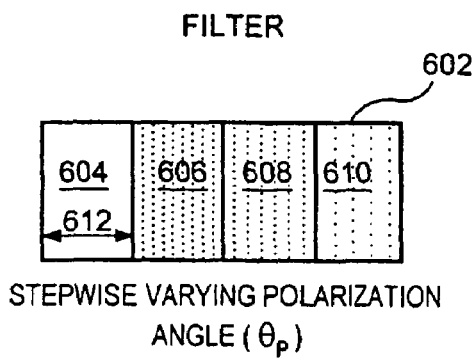
FIG. 6A is a diagram illustrating an exemplary spatially-varying polarization filter in accordance with the present invention.
Figure 6B:
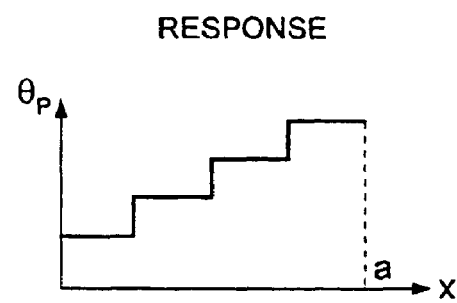
FIG. 6B is a graph illustrating a spatially-varying optical characteristic of the filter illustrated in FIG. 6A.

An example of such a polarization filter 602 is illustrated in FIG. 6A. In the illustrated polarization filter 602, the polarization angle $\theta_p$ with respect to, e.g., the vertical direction of the illustrated filter 602 varies as a step-wise function of position x across the filter, as is illustrated in FIG. 6B. The filter 602 includes four portions 604, 606, 608, and 610, each portion being a linear polarizer having the same width 612 but a different polarization angle $\theta_p$.

The brightness of a radiation ray passing through the polarization filter 602 can be expressed as a linear combination of a diffuse component $B_d$ and a specular component $B_s$:

$$B = B_d + B_s \tag{9}$$

Assuming that the radiation ray is being received and processed by a polarization filter, the specular component $B_s$ can be further decomposed into a constant term $B_{sc}$ and a term $B_{sv}\cos2(\theta_p - \alpha)$ which varies sinusoidably as a function of the polarization angle $\theta_p$ of the polarization filter:

$$B = B_d B_{sc} + B_{sv}\cos2(\theta - \alpha), \tag{10}$$

where $\alpha$ is the angle of polarization of the specular component $B_s$. As is illustrated in FIG. 35, B is a sinusoidal function of $\theta_p$, having minimum and maximum values $B_{min}$ and $B_{max}$, respectively.

Now, referring again to the polarization filter 602 illustrated in FIG. 6A, translating this filter 602 by a distance not exceeding the filter portion width 612 between successive frames ensures that each pixel is sampled using all four different polarization filter angles. It is well known that three discrete values of $\theta_p$, along with the corresponding brightness measurements B, are sufficient to compute $B_{min}$, $B_{max}$, and $\alpha$ for each pixel. The degree of polarization is then computed (in the processing step 120 illustrated in FIG. 1) as follows:

$$p = \frac{B_{max} - B_{min}}{B_{max} + B_{min}} \tag{11}$$

It is to be noted that although the polarization filter 602 illustrated in FIG. 6A consists of discrete portions 604, 606, 608 and 610, and therefore has a step-wise varying polarization angle $\theta_p$, the polarization angle $\theta_p$ need not be such a step-wise function of location x. For example, across the polarization filter 602, the polarization angle $\theta_p$ can be a smoothly varying—e.g., a linearly varying—function of position x.

In any case, as is discussed above with respect to FIGS. 1, 2A, and 2B, the optical element 204—in this example, the polarization filter 602—is in a first position 264 during the recording of the first image (steps 108, 110, and 112 of FIG. 1), and a second position 266 during the recording of the second image (steps 114, 116, and 118 of FIG. 1). Therefore, although radiation ray bundles 208 and 240 have the same chief ray 210, these ray bundles 208 and 240 are polarization filtered according to the different polarization filtering characteristics of filter portions 226 and 228, respectively. Similarly, although radiation ray bundles 214 and 248 have the same chief ray 216, these ray bundles 214 and 248 are polarization filtered according to the different polarization filtering characteristics of filter portions 228 and 260, respectively, because the filter 502 has moved between the steps recording the first and second images (steps 108, 110 and 112 and steps 114, 116 and 118 in FIG. 1). Likewise, although radiation ray bundles 220 and 254 have the same chief ray 222, these ray bundles 220 and 254 are polarization filtered according to the different polarization filtering characteristics of filter portions 230 and 232, respectively.

In accordance with an additional aspect of the present invention, a moving optical element can be used to adjust the focal characteristics of an imager. The focal characteristics can be adjusted differently for radiation ray bundles having different chief rays in the reference frame of the imager. Such a technique not only can be used to record images in which nearly every scene feature is in focus, but can also be used to obtain information about the depths of various scene portions—i.e., the distances between the scene portions and the imager. The effect of using an optical element to adjust the focal characteristics of an imager can be further understood with reference to the optical system illustrated in this FIG. 29. In the illustrated system, a radiation ray bundle 2904 emanating from a scene point 2902 is focused by a lens 206 to produce an additional radiation ray bundle 2906. In the absence of any additional optical elements, radiation ray bundle 2906 is focused at a particular point P in space. However, if a refractive element 1212 having a thickness t is inserted behind the lens 206, the refractive element 1212 processes radiation ray bundle 2906 to produce a processed radiation ray bundle 2910 which is focused at a different point P'. The amount by which the refractive element 1212 shifts the point of focus—i.e., the distance d between the non-adjusted focus point P and the adjusted focus point P'—depends upon the thickness t of the refractive element 1212, the index of refraction $\mu$ of the refractive element 1212, and the characteristics of the other optical components of the imaging system. If an image detector (e.g., the image detector 202 illustrated in FIGS. 2A and 2B) is located in the plane 2914 containing the first point of focus P, and there is no refractive element 1212, then the scene point 2902 is imaged as a well-focused imaged point. However, if the image detector 202 is located in a different plane—e.g., the plane 2916 containing the second point of focus P'—when the refractive element is absent, then the scene point 2902 is imaged not as a well-focused point, but as a blurry spot having a non-zero blur diameter 2908.

Similarly, if the refractive element 1212 is present, and the image detector 202 is located in the plane 2916 containing the second point of focus P', the scene point 2902 is imaged as a well-focused point. On the other hand, if the image detector 202 is located in a different plane—e.g., the plane 2914 containing the first point of focus P, then the scene point 2902 is imaged as a blurry spot having a non-zero blur diameter 2912. The plane in which the image detector 202 must be located in order to produce a focused image of a particular scene point 2902 depends upon the thickness t and refractive index μ of the refractive element 1212, the characteristics of the other components of the imager, and the distance 2918 between the scene point 2902 and the lens 206. Thus, it can be seen that by inserting a refractive element 1212 into an imager, or by adjusting the thickness t of such a refractive element, the radiation coming from a scene point 2902 can be brought in and out of focus at an image detector 202 in a fixed position.

A parallel refractive plate having a refractive index μ>1 effectively increases the optical distance between the lens 206 and the image detector 202 of the imaging system, and shifts the focus of the image of the scene longitudinally—i.e., in the direction of the optical axis—by a longitudinal shift amount d which can be determined based on the refractive index μ and thickness t of the plate:

$$d = \frac{(\mu - 1)}{\mu} t \tag{12}$$

The benefits of adjusting the focal characteristics of the imager using an optical element can be further understood with reference to the imagers 200 illustrated in FIGS. 12A and 12B. In the imager 200 illustrated in FIG. 12A, a radiation ray bundle 1202 emanating from a scene point 1208 is processed (in his case, refracted) by a lens 206 to produce an additional radiation ray bundle 1204 which is focused upon a particular point 1206 on an image detector 202. Because the resulting image of the scene point is well-focused, the scene 1208 can be thought of as located at an "object distance of best focus" $D_{bf}$ with respect to, e.g., the lens 206 or another part of the imager 200. Any scene point which is at that distance $D_{bf}$ will be recorded by the image detector 202 as a well-focused point.

However, the object distance of best focus $D_{bf}$ of the imager 200 can be changed by adding an optical element such as the refractive element 1212 illustrated in FIG. 12B. In the system illustrated in FIG. 12B, a scene point 1208 located at the original object distance of best focus $D_{bf}$ is not imaged as a well-focused point, but instead is recorded as a blurry spot having a non-zero blur diameter 1220. In contrast, a scene point 1216 located at an adjusted object distance of best focus $D_{bf}'$ is imaged as a well-focused point 1206 on the image detector 202. In other words, a radiation ray bundle 1214 emanating from the second scene point 1216 is refracted by the lens 206 to produce an additional radiation ray bundle 1218 which is itself processed by the refractive element 1212 to produce yet another radiation ray bundle 1222, ray bundle 1222 being well-focused upon the image detector 202. In fact, with respect to any particular radiation ray bundle received by the imager 200, the imager 200 can be characterized in terms of an object distance of best focus associated with the chief ray of that particular ray bundle. In other words, the imager 200 can be characterized in terms of the distance at which a scene object will be imaged in a well-focused manner. The optical characteristics of the optical element 1212 can be adjusted, e.g., by inserting a thicker refractive element, or by moving a spatially varying optical element such as the refractive wedge 702 illustrated in FIG. 7A. The amount of adjustment $\Delta D_{bf}$ varies with the thickness t of the refractive element.

Figure 7A:
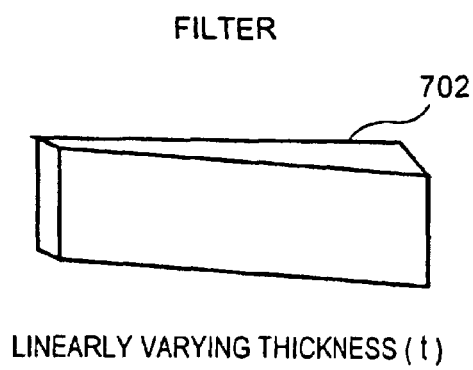
FIG. 7A is a diagram illustrating an exemplary refractive element having a spatially-varying thickness in accordance with the present invention.
Figure 7B:
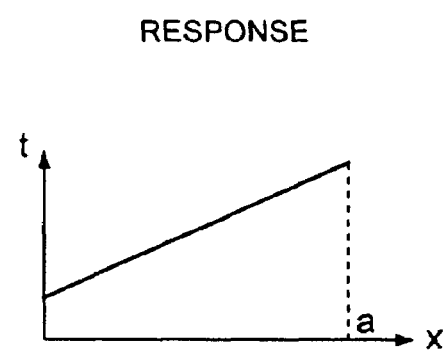
FIG. 7B is a graph illustrating a spatially-varying optical characteristic of the refractive element illustrated in FIG. 7A.

Now consider an imager 200, such as is illustrated in FIGS. 2A and 2B, in which the optical element 204 is a spatially varying refractive element such as the refractive wedge 702 illustrated in FIG. 7A. As is illustrated in FIGS. 7A and 7B, this refractive wedge 702 has a spatially varying thickness t. Such a refractive element 702 adjusts the focal characteristics of the imager 200 differently for radiation rays received and processed by different portions of the element 702. Typically, the pitch of the wedge 702 is sufficiently small that, for a single radiation ray bundle, the wedge 702 can be approximated as a parallel plate. As is discussed above with respect to FIGS. 1, 2A, and 2B, the optical element 204—in this case, the refractive wedge 702—is in a first position 264 during the recording of the first image (steps 108, 110 and 112 of FIG. 1), and a second position 266 during the recording of the second image (steps 114, 116 and 118 of FIG. 1). Therefore, although radiation ray bundles 208 and 240 have the same chief ray 210, the respective object distances of best focus associated with these ray bundles 208 and 240 are adjusted by the different amounts of adjustment associated with optical element portions 226 and 228, respectively. Similarly, although radiation ray bundles 214 and 248 have the same chief ray 216, the object distances of best focus associated with these ray bundles 214 and 248 are adjusted by the different amounts of adjustment associated with optical element portions 228 and 260, respectively, because the refractive wedge 702 has moved between the steps recording the first and second images (steps 108, 100 and 112, and steps 114, 116 and 118 in FIG. 1). Likewise, although radiation ray bundles 220 and 254 have the same chief ray 222, the object distances of best focus associated with these ray bundles 220 and 254 are adjusted by the different amounts of adjustment associated with optical element portions 230 and 232, respectively.

Translating the wedge filter 702—e.g., at a constant velocity, as is illustrated in FIG. 23B—has the effect of continuously changing the imager's focus setting—e.g., its object distance of best focus—with respect to radiation ray bundles having any particular chief ray. This effect is equivalent to varying the longitudinal position of the internal focal point of each radiation ray bundle received by the imager 200. In other words, a scene point (i,j) that was perfectly in focus before the translation of the filter 702 began will become increasingly defocused during translation. The effective radius by of the blur function associated with the scene point (i,j) is approximately proportional to the longitudinal shift amount d, and will therefore, in this example, increase approximately linearly with time until the translation of the wedge 702 changes speed or direction, as is illustrated in FIG. 36A. If, as is illustrated in FIGS. 36A and 36B, the integration time $T_p$ of the image detector 202 is significant compared to the translation time period $T_b$, the effective blur function for pixel (i,j) in the $n^{th}$ image can be approximated as the average of the various blur functions occurring within the integration time of the $n^{th}$ image.

It is to be noted that the radius $b_{ij}$ of the blur circle is dependent on the depth of the scene point. In addition, the maximum blur radius $b_{max}$ is dependent on the depth of the scene point. Therefore, the value of the blur radius function $b_{ij}^{(n)}$ will vary from pixel to pixel depending on the respective depths of the various scene points imaged on the respective pixels. These depths are typically not known in advance.

Now consider a set of images acquired as the refractive wedge 702 is translated. The processing of these images (step 120 in FIG. 1) is as follows. Image blurring is a form of low-pass filtering. Therefore, if a high-pass filter is applied to each image/frame of the image sequence, the output of the high-pass filter for a particular pixel in a particular frame will depend on the degree of initial blurring at the pixel. This output of the high-pass filtering can be used to represent the "focus quality" of the pixel. An exemplary plot of focus quality versus time for a particular pixel (i,j) is illustrated in FIG. 30. Interpolation of this plot using, e.g., a Gaussian function can provide an estimate of the peak value $F_{ij}$ and the mean time $\bar{t}_{ij}$. Because the location of the wedge filter at the mean time $\bar{t}_{ij}$ is known, and because all of the other optical parameters of the imaging system are presumably also known, these optical parameters can be used in conjunction with the well-known Gaussian lens equation to find the depth of the scene point—i.e., the distance between the scene point and the imager 200.

In addition, the pixel brightness measurement acquired closest to the mean time $\bar{t}_{ij}$ is the best-focused measurement of this pixel. Therefore, in the processing step 120, this measurement can be used as the focused brightness of the scene point in a fused image based on the recorded image sequence—i.e., the data from less focused measurements are discarded. Alternatively, or in addition, the processing step 120 can include deriving a weighted average of the measurements, in which better-focused measurements are given more weight. In the case of the exemplary pixel whose focus quality $F_{ij}$ is plotted in FIG. 30, the $t=3T_p$ measurement is used. Repeating the above-described process for all image points provides a depth map of the scene, and also provides a fused image which is well-focused at every pixel.

In accordance with an additional aspect of the present invention, an enhanced-resolution image can be obtained by recording multiple lower-resolution images while applying slight vertical and/or horizontal shifts to the locations at which radiation rays are received by the image detector 202. Unlike conventional video images; which typically have 640×480 pixels, the image data captured by the technique of the present invention can be used to produce fused images having much higher resolution using the same image detector 202. The aforementioned technique can be further understood with reference to the imager 200 illustrated in FIG. 13. In the illustrated imager 200, a refractive plate 1302 having a thickness t is located between the lens 206 and the image detector 202. The surface normal 1310 of the refractive plate 1302 is oriented at an angle γ with respect to the optical axis 1304 of the imager 200. Each radiation ray bundle received by the plate 1302 from the lens 206 is processed by the plate 1302 to produce a radiation ray bundle which is detected by the image detector 202. For example, ray bundle 1314 is processed by the refractive plate 1302 to produce a ray bundle (1316 or 1320) which has a chief ray (1318 or 1322). The point at which the chief ray (1318 or 1322) of the processed radiation ray bundle (1316 or 1320) intersects the image detector 202 depends upon the orientation of the plate 1302—i.e., the value of the angle γ. For example, if γ equals zero, the resulting ray bundle 1316 has a chief ray 1318 which impinges on the image detector 202 at a first point Q—the same point at which the chief ray 1318 would impinge on the detector 202 if the plate 1302 were not present. On the other hand, if γ has a different value, then the resulting ray bundle 1320 has a chief ray 1322 which impinges on the image detector 202 at a different point Q'.

In some cases, changing the angle γ of orientation of the plate 1302 can have the additional effect of changing the longitudinal position—i.e., the location in the direction of the optical axis 1304—of the point at which the processed radiation ray bundle 1316 is focused. For example, if γ equals zero, the processed radiation ray bundle 1316 may be focused at point Q, whereas, if γ has a different value, the processed radiation ray bundle 1316 may be focused at a point Q'' which has a different longitudinal position. If the motion of the refractive plate 1302 were large, the difference d of the two longitudinal positions Q and Q'' might be significant. However, in most applications, the motion of the plate 1302 is relatively small, and because the longitudinal shift is a second-order effect, any defocusing caused by the tilting of the plate 1302 can typically be neglected.

While multiple images are being recorded, the refractive plate 1302 is moved in the reference frame of the imager 200. For example, the plate 1302 can be moved in a rocking motion 1306 in which the angle γ of orientation is varied in an oscillatory (e.g., sinusoidal or triangle-wave) pattern. Alternatively, or in addition, the plate 1302 can be rotated (motion 1308) about the optical axis 1304. In any case, the plate is preferably moved continuously—i.e., without stopping for any significant amount of time—while images are being recorded.

In any individual image, the vertical and/or horizontal shift w resulting from the tilt of the plate 1302 is applied to all imaged points—i.e., the entire image is shifted by the same amount: w. The lateral shift w can be determined based on the thickness t, refractive index μ, and tilt angle γ of the plate:

$$w = t\sin\gamma\left(1 - \sqrt{\frac{1-\sin^2\gamma}{\mu^2-\sin^2\gamma}}\right) \tag{13}$$

As is illustrated in FIG. 18, a typical electronic image detector 202 includes an array of detector elements 1702 each having a center location 1714. Preferably, the motion of the refractive plate 1302 is sufficient to ensure that radiation ray bundles whose chief rays would not otherwise be centered upon any of the detector elements 1702 are deflected so that they sweep across the center locations 1714 of the respective detector elements 1702. For example, radiation ray bundles 1802—which comprise radiation from various portions 268, 270, and 272 of the scene 274, and which have respective chief rays 1810—are received by the refractive plate 1302 and processed to produce processed radiation ray bundles 1804, the processed ray bundles having respective chief rays 1806. As the refractive plate 1302 is rocked back and forth (motion 1306), the chief rays 1806 of the processed radiation ray bundles 1804 sweep across the image detector 202, following respective paths 1808 of incidence on the image detector 202. At any given moment, there will be radiation ray bundles whose chief rays do not impinge on the center portion 1714 of any detector element 1702 and, in fact, may not even be received by any of the detector elements 1702. However, even if the maximum deflection is quite small—e.g., equal to the distance between adjacent detector elements 1702—the shifting of the recorded image across the image detector 202 is sufficient to ensure detection, during at least part of the cycle of motion, of many radiation ray bundles which would not otherwise be detected. Preferably, the deflection should be applied in multiple directions—i.e., vertical, horizontal, and diagonal—in order to provide more complete coverage of the scene portions which would otherwise fall between pixels. As discussed above, the set of images thus recorded can be fused (step 120 in FIG. 1) to form a single high-resolution image. The motion 1306 of the plate 1302 is known, and this information is used in the fusion procedure (step 120) to calculate the amount and direction of the lateral shift present in each image. The respective shifts are used to calculate the locations of the pixels to be included in the fused image. Each pixel in the fused image has a brightness value based on the intensity measurement taken under the lateral shift corresponding to the location of that particular pixel. For example, if pixel (i,j) in the $n^{th}$ frame has a brightness value $B_{ij}^{(n)}$, and if the $n^{th}$ frame has vertical and horizontal shifts of zero, then pixel (i,j) in the fused image is given the same brightness value $B_{ij}^{(n)}$.

On the other hand, if, for example, the $n^{th}$ frame has a horizontal shift of $+\Delta i$ and a vertical shift of $+\Delta j$, then the fusion procedure 120 creates a pixel having a location $(i+\Delta i, j+\Delta j)$ in the fused image, and assigns a brightness value of $B_{ij}^{(n)}$ to that pixel $(i+\Delta i, j+\Delta j)$.

The above-described technique of vertically and/or horizontally shifting an image across an image detector 202 is not limited to the use of refractive elements, but can also be carried out using a reflective element such as the mirror 1704 illustrated in FIG. 17. In the illustrated imager 200, the mirror 1704 receives radiation from the scene 274 and deflects this radiation toward an image detector 202. For example, the mirror 1704 receives from the lens 206 a radiation ray bundle 1706 which comprises radiation from a particular scene portion 1734, and which has a particular chief ray 1708. While the mirror 1704 is in a first position 1726, the mirror 1704 processes the incoming radiation ray bundle 1706 by reflecting the ray bundle 1706 to produce a processed radiation ray bundle 1710 having a chief ray 1712. The chief ray 1712 of the processed radiation ray bundle 1710 may not impinge on any of the center locations 1714 of the detector elements 1702 in the image detector 202. However, if the mirror 1704 is moved into a second position 1728—using, for example, a rocking motion 1716—the resulting processed radiation ray bundle 1730 has a chief ray 1732 which is received by one of the detector elements 1714 of the image detector 202. Alternatively to, or in addition to, moving the mirror 1704 in a rocking motion 1716, the mirror 1704 can be rotated (motion 1718) about an axis 1722 which is non-parallel—i.e., at a non-zero angle 1724—with respect to the surface normal vector 1720 of the mirror 1704.

The exemplary procedure illustrated in FIG. 20, discussed above with respect to the imager 200 illustrated in FIG. 19B, can also be used to operate the imagers 200 illustrated in FIGS. 17 and 18. In the illustrated procedure, the optical element (e.g., the refractive element 1302 illustrated in FIG. 18 or the reflective element 1704 illustrated in FIG. 17) is moved into a first position (step 2002). A first set of radiation ray bundles is received by the optical element (step 2004). The first set of radiation ray bundles is optically processed to produce a second set of radiation ray bundles (step 2006). The second set of ray bundles is detected by an image detector 202 to derive a first set of intensity values (step 2008). The first set of intensity values is recorded as a first image (step 2018). The optical element is then moved into a second position (step 2010), in which the optical element receives a third set of radiation ray bundles (step 2012). The optical element optically processes the third set of radiation ray bundles to produce a fourth set of radiation ray bundles (step 2014). The fourth set of radiation ray bundles is detected by the image detector 202 to derive a second set of intensity values (step 2016). The second set of intensity values is recorded as a second image (step 2020). The measured intensity values in the first and second images are processed (step 120) to derive a fused image which includes the processed intensity values, using the fusion procedure discussed above with respect to FIG. 1. The resulting, fused image has extra pixels—i.e., enhanced spatial resolution compared to the first and second images.

Figure 14A:
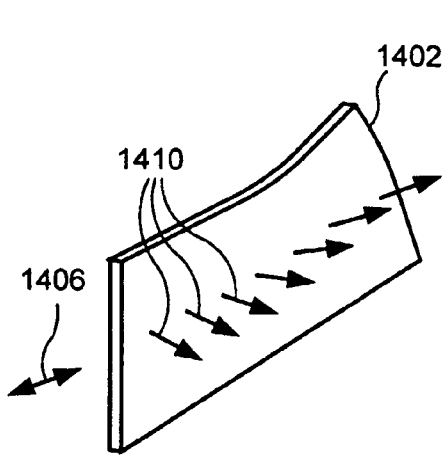
FIG. 14A is a diagram illustrating an exemplary refractive element in accordance with the present invention.

Any of a number of different types of optical elements can be used to vary the deflection of radiation ray bundles within an imager. For example, as illustrated in FIG. 14A, a twisted refractive plate 1402 can be moved in a linear motion 1406 within the imager 200 illustrated in FIGS. 2A and 2B. Because each portion of the twisted plate 1402 has a different surface normal vector 1410, different amounts of deflection are applied to radiation ray bundles processed by different portions of the twisted plate 1402. A similar effect can also be achieved by using a refractive plate which has parallel (i.e., non-twisted) faces, but which has a spatially varying refractive index.

Figure 14B:
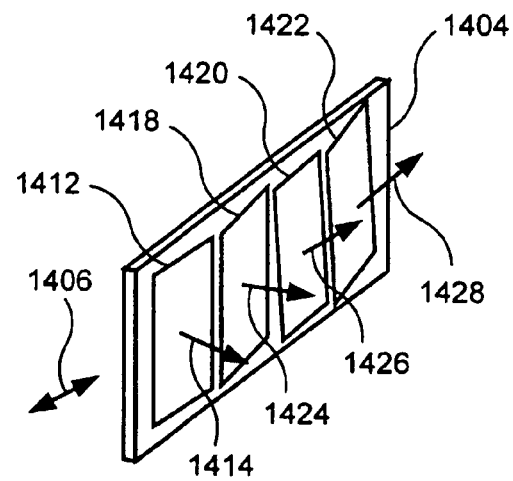
FIG. 14B is a diagram illustrating an additional exemplary refractive element in accordance with the present invention.

A spatially varying optical element used to apply different amounts of deflection to radiation ray bundles need not be a smoothly varying element such as the twisted refractive plate 1402 illustrated in FIG. 14A. For example, as illustrated in FIG. 14B, a refractive optical element 1404 can have two or more discrete refractive portions 1412, 1418, 1420, and 1422 having different surface normal vectors 1414, 1424, 1426, and 1428, respectively. In the exemplary optical element 1404 illustrated in FIG. 14B, vector 1414 is parallel to the optical axis, vector 1424 is tilted horizontally, vector 1426 is tilted vertically, and vector 1428 is tilted both vertically and horizontally. FIGS. 31A-31C illustrate the resulting vertical and horizontal shifts $sx_{ij}$ and $sy_{ij}$ seen by a pixel $(i,j)$ as a function of time. FIG. 32 illustrates the four sets of pixels 3202, 3204, 3206, and 3208 recorded using the four different lateral shifts/deflections. As is illustrated, the lateral shifting of the recorded image enables the imager 200 to effectively capture measurements at additional pixel locations in image space. In this example, only one of the four sets of pixels 3202, 3204, 3206, and 3208 would have been available from a single image recorded by the image detector 202.

Figure 14C:
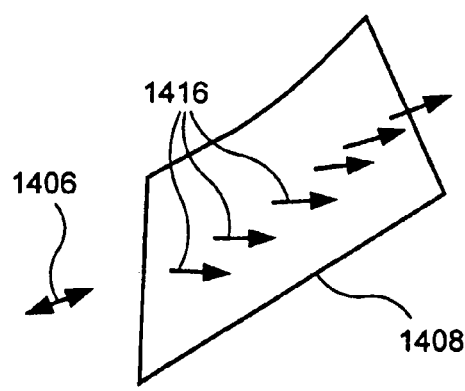
FIG. 14C is a diagram illustrating an exemplary reflective element in accordance with the present invention.

In the configuration illustrated in FIG. 17, the mirror 1704 can be a twisted reflective sheet 1408 such as is illustrated in FIG. 14C. The directions of the surface normal vectors 1416 of the reflective sheet 1408 vary in the direction of motion 1406. This reflector 1408 is translated in an oscillating, linear motion 1406.

Figure 13:
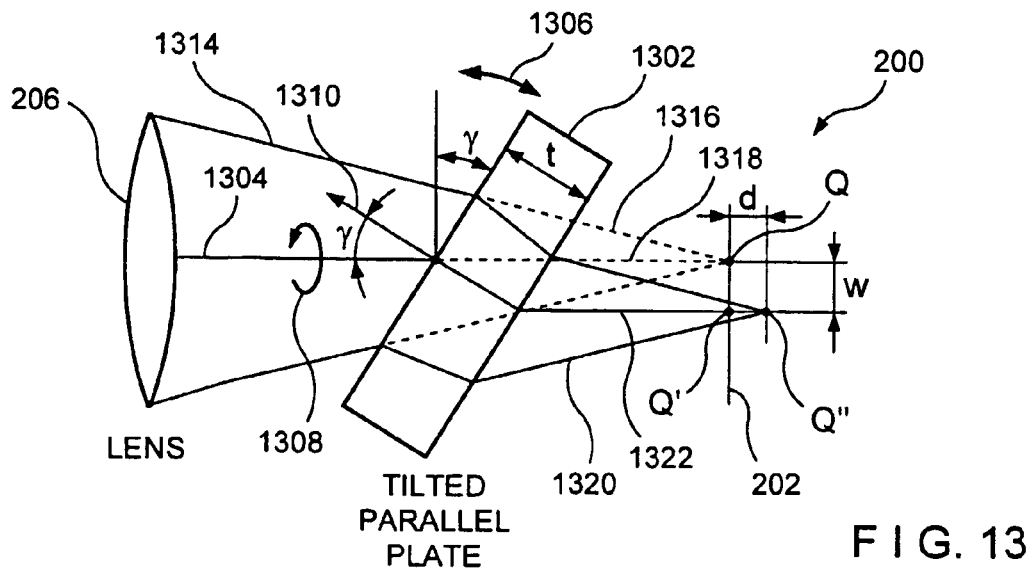
FIG. 13 is a diagram illustrating yet another exemplary system for recording images in accordance with the present invention.

In any case, translating a spatially varying refractive or reflective element such as the elements 1402, 1404, and 1408 illustrated in FIGS. 14A, 14B, and 14C, respectively, has an effect similar to that of rocking a planar refractive or reflective element such as the refractive plate 1302 illustrated in FIG. 13 or the mirror 1704 illustrated in FIG. 17. As is discussed above with respect to FIGS. 1, 2A, and 2B, the spatially varying optical element—e.g., refractive or reflective element 1402, 1404, or 1408—is in a first position 264 during the recording of the first image (steps 108, 110 and 112 of FIG. 1), and a second position 266 during the recording of the second image (steps 114, 116 and 118 of FIG. 1). Therefore, referring to FIGS. 2A and 2B, although radiation ray bundles 208 and 240 have the same chief ray 210, these ray bundles 208 and 240 are deflected by the different deflection amounts associated with optical element portions 226 and 228, respectively. Similarly, although radiation ray bundles 214 and 248 have the same chief ray 216, these ray bundles 214 and 248 are deflected by the different deflection amounts associated with optical element portions 228 and 260, respectively, because the refractive or reflective element 204 has moved between the steps recording the first and second images (steps 108, 110 and 112, and steps 114, 116 and 118 in FIG. 1). Likewise, although radiation ray bundles 220 and 254 have the same chief ray 222, these ray bundles 220 and 254 are deflected by the different deflection amounts associated with optical element portions 230 and 232, respectively.

The resulting image sequence is a set of images that are shifted by various amounts in the vertical and/or horizontal directions. This enables the imager 200 to obtain brightness measurements which would otherwise be located between the pixels. Because all of the image shifts are known, the images can be easily fused, as discussed above, to obtain a high resolution image of the scene. The fused image includes extra, spatially shifted pixels which are located in-between the pixel locations of a conventional image. The extra pixels would not have been available from a single image recorded by the image detector 202.

Figure 15A:
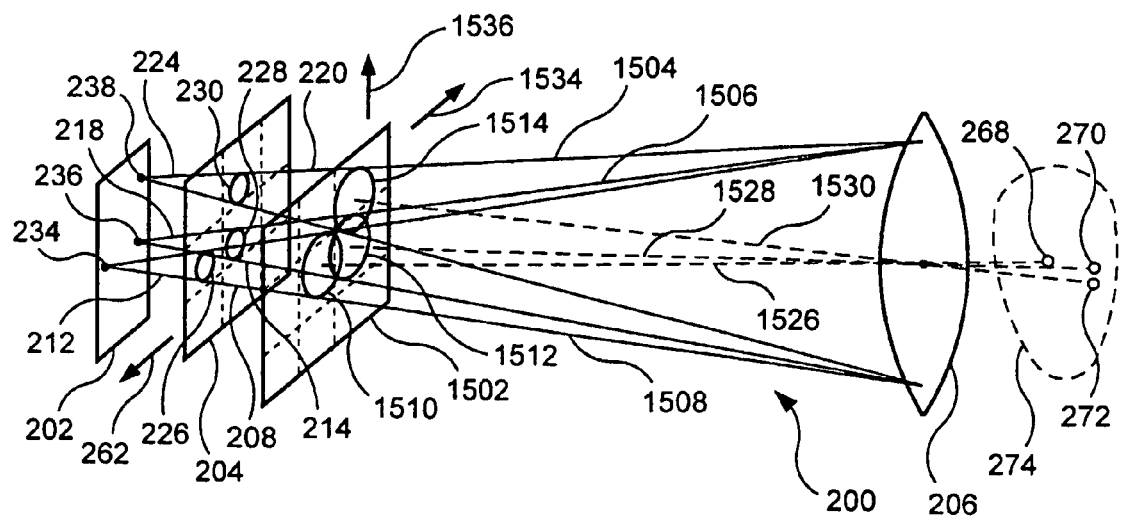
FIG. 15A is a diagram of a further exemplary system for recording images in accordance with the present invention.
Figure 16:
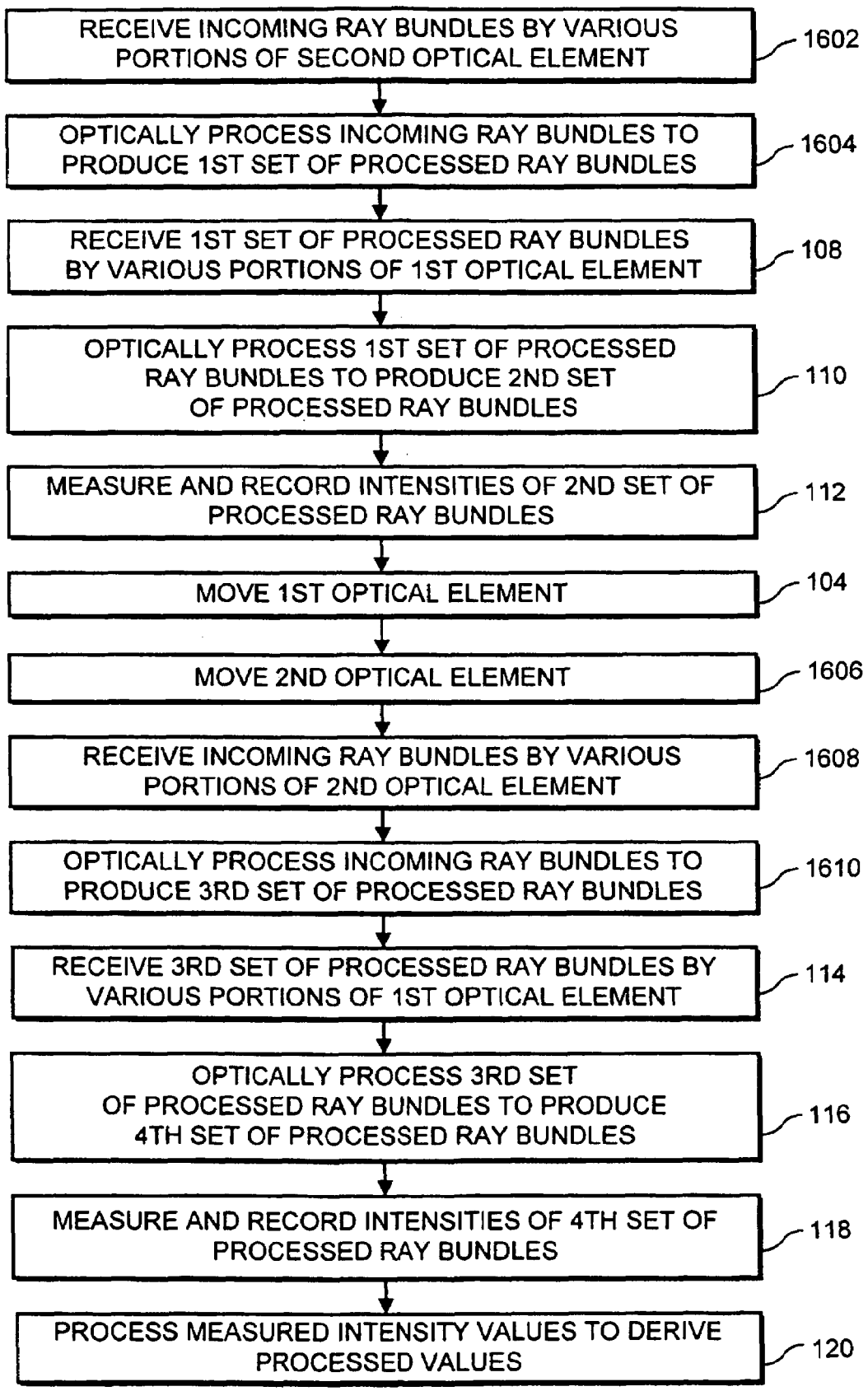
FIG. 16 is a flow diagram illustrating an exemplary procedure for recording images in accordance with the present invention.

Although the techniques described above have emphasized the use of a single, moving optical element to perform a single type of optical processing—e.g., intensity reduction, spectral filtering, polarization filtering, adjustment of the object distance of best focus, or adjusting an amount of deflection—the invention is not limited to a single optical element or a single type of optical processing. For example, as illustrated in FIG. 15A, an imager 200 can include two optical elements 204 and 1502 which move independently. The optical elements 204 and 1502 are preferably located between the image detector 202 and the lens 206. FIG. 16 is a flow diagram illustrating an exemplary procedure for operating the imager 200 illustrated in FIG. 15A. In the illustrated procedure, during the recording of a first image (steps 1602, 1604, 108, 110 and 112), light ray bundles 1508, 1506, and 1504 from scene portions 268, 270, and 272, respectively, are received by portions 1510, 1512, and 1514, respectively, of the outer optical element 1502—i.e., the element 1502 closest to the lens 206 (step 1602). The respective portions 1510, 1512, and 1514 of optical element 1502 optically process the incoming radiation ray bundles 1508, 1506, and 1504 to produce processed radiation ray bundles 208, 214, and 220, respectively (step 1604), which are received by portions 226, 228, and 230 of the inner optical element 204—i.e., the element 204 furthest away from the lens 206 (step 108). If the outer optical element 1502 is being moved in a horizontal direction 1534, the optical characteristic(s) of optical element portion 1510 is/are preferably different from the optical characteristics of optical element portions 1512 and 1514. Alternatively, or in addition, if the outer optical element 1502 is being moved in a vertical direction 1536, the optical characteristic(s) of optical element portion 1514 is/are preferably different from those of portions 1510 and 1512.

Optical element portions 226, 228, and 230 process radiation ray bundles 208, 214, and 220, respectively, to produce radiation ray bundles 212, 218, and 224 (step 110). Portions 234, 236, and 238 of the image detector 202 measure and record the intensities of the second set of processed radiation ray bundles 212, 218, and 224 (step 112) to complete the recording of the first image. After the first image is recorded (steps 1602, 1604, 108, 100 and 112), the optical elements 204 and 1502 are moved in the reference frame at the imager 200 (steps 104 and 1606), and a second image is recorded (steps 1608, 1610, 114, 116 and 118). The outer optical element 1502 can be moved: (a) in a direction 1534 which is parallel to the direction of motion 262 of the inner optical element 204, (b) in a direction 1536 which is perpendicular to direction 262, or (c) in a combination of directions 1534 and 1536.

In order to record the second image (steps 1608, 1610, 114, 116 and 118), the outer optical element 1502 receives and processes radiation ray bundles 1520, 1522, and 1524 to produce radiation ray bundles 240, 248, and 254, respectively (steps 1608 and 1610). Ray bundles 1520, 1522, and 1534 have the same chief rays—1526, 1528, and 1530, respectively—as the radiation ray bundles 1508, 1506, and 1504 which were received and processed during the recording of the first image in steps 1602, 1604, 108, 110 and 112. However, radiation ray bundles 1520, 1522, and 1524 are received and processed by respective portions 1516, 1532, and 1518 of the outer optical element 1502, rather than the portions 1510, 1512, and 1514 which received and processed radiation ray bundles 1508, 1506, and 1504, respectively during the steps 1602, 1604, 108, 110 and 112 of recording the first image. For example, radiation ray bundle 1520 is received and processed by optical element portion 1516, rather than optical element portion 1510, because although radiation ray bundle 1520 has the same chief ray 1526 as radiation ray bundle 1508, the optical element 1502 has moved between the steps of recording the first and second images (steps 1602, 1604, 108, 110 and 112, and steps 1608, 1610, 114, 116 and 118). Similarly, although radiation ray bundle 1522 has the same chief ray 1528 as radiation ray 1506, radiation ray bundle 1522 is not received and processed by optical element portion 1512, but by optical element portion 1532. Likewise, although radiation ray bundle 1524 has the same chief ray 1530 as radiation ray bundle 1504, radiation ray bundle 1524 is not received and processed by optical element portion 1514, but by a different portion 1518 of the optical element 1502. If the outer optical element 1502 is being moved in a horizontal direction 1534, the optical characteristic(s) of optical element portion 1516 is/are preferably different from the optical characteristics of optical element portions 1532 and 1518. Alternatively, or in addition, if the outer optical element 1502 is moved in a vertical direction 1536, the optical characteristic(s) of optical element portion 1518 is/are preferably different from those of portions 1516 and 1532.

Figure 15B:
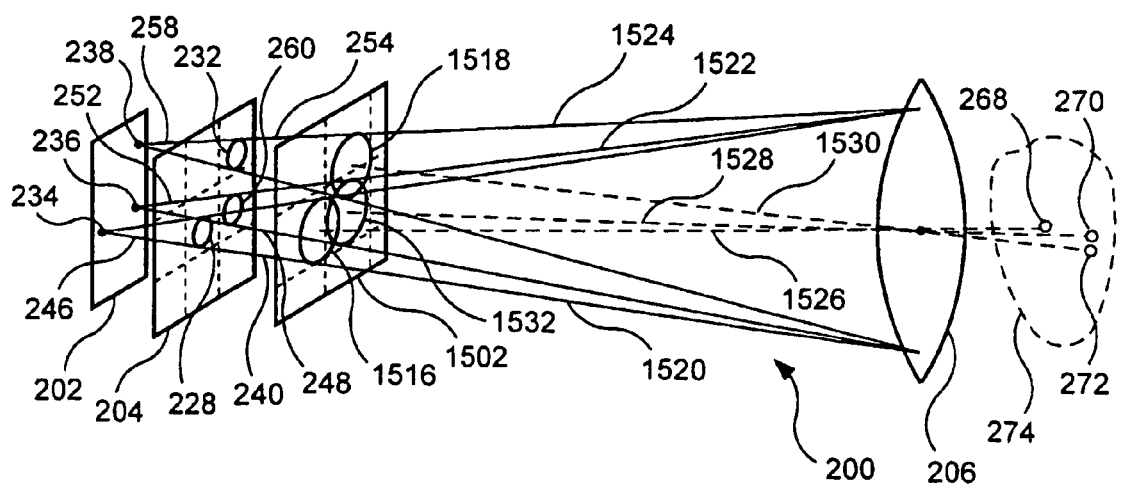
FIG. 15B is a diagram illustrating an alternative configuration of the system illustrated in FIG. 15A.

Referring to FIG. 15B, portions 1516, 1532 and 1518 of the outer, optical element 1502 have produced processed radiation ray bundles 240, 248, and 254, respectively (step 1610), and these processed radiation ray bundles 240, 248, and 254 are received and processed by portions 228, 260, and 232 of the inner optical element 204 to produce a fourth set of processed radiation ray bundles 246, 252, and 258 (steps 114 and 116). The image detector 202 then measures and records the intensities of the fourth set of processed radiation ray bundles 246, 252, and 258 (step 118).

Typically, the optical elements 204 and 1502 perform different types of optical processing. For example, one of the optical elements 204 and 1502 can be an intensity reduction filter, and the other can be a spectral filter or a polarization filter. Similarly, one of the optical elements 204 and 1502 can be a spectral filter, and the other can be a polarization filter. In fact, there is no particular limit to the numbers and types of optical elements which can be used in an imager 200 in accordance with the present invention.

Figure 33:
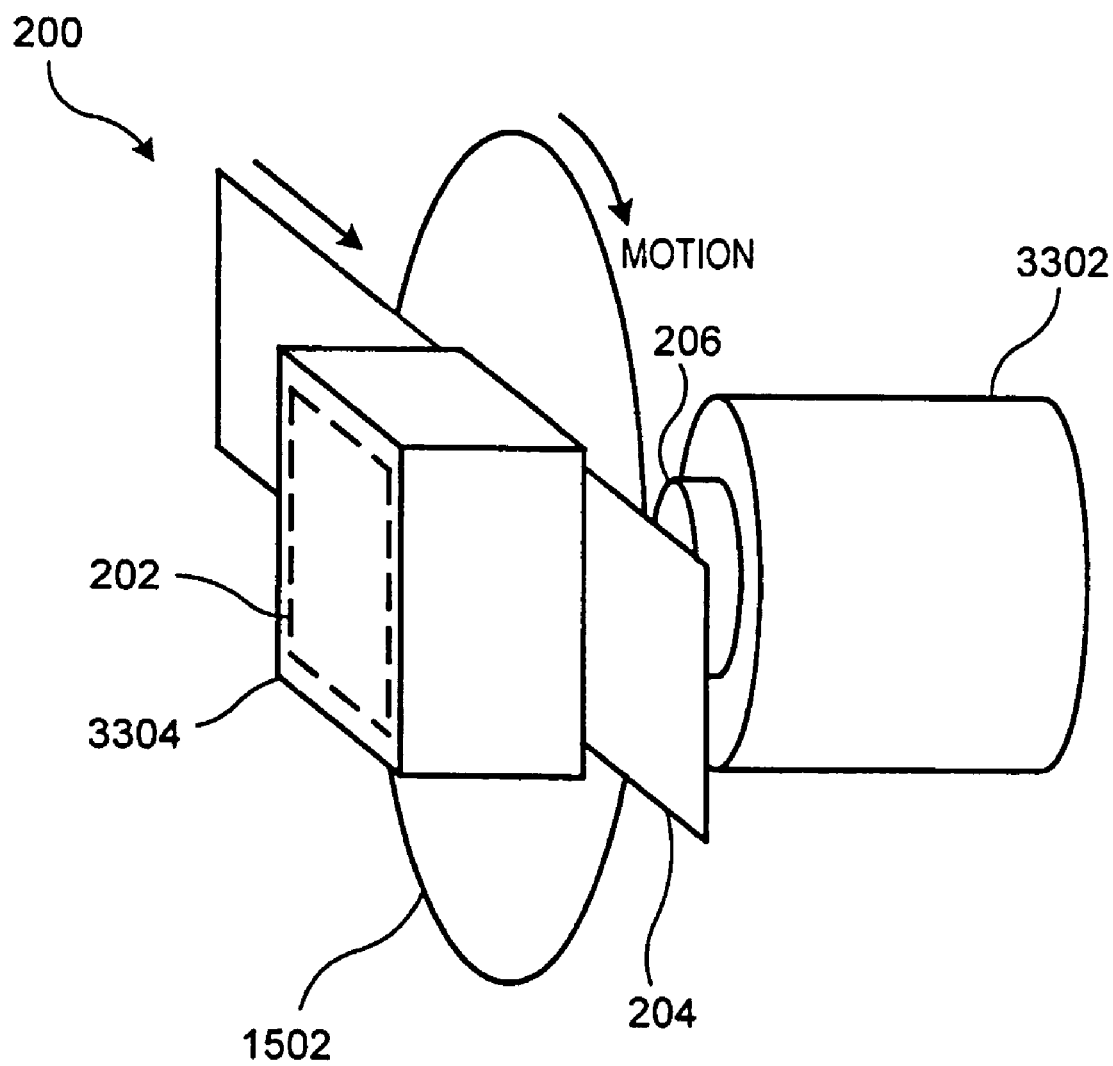
FIG. 33 is a diagram illustrating yet another exemplary system for recording images in accordance with the present invention.

In addition, although the optical elements 204 and 1502 illustrated in FIGS. 15A and 15B are portrayed as rectangular elements which are linearly translated between frames, one or more of the optical elements in an imager 200 can be shaped differently and/or moved differently. For example, FIG. 33 illustrates an imager 200 having a rectangular optical element 204 which is linearly translated between frames, and a circular optical element 1502 which is rotated between frames. The illustrated imager 200 also includes a lens assembly 3302 containing one or more lenses, including lens 206. The imager 200 also includes an image detector assembly 3304 which includes an image detector 202. The optical elements 204 and 1502 are located between the image detector assembly 3304 and the nearest lens 206 of the lens assembly 3302. Such an arrangement is particularly useful for imaging scene points using two different types of optical filter. For example, suppose that the linearly translated element 204 is a linearly varying spectral filter such as the filter 502 illustrated in FIG. 5A, and that the rotated optical element 1502 is an azimuthally varying intensity reduction filter such as the filter 802 illustrated in FIG. 8A. If several rotations of the intensity reduction filter 1502 correspond to a single cycle of the motion of the spectral filter 204, then the imager 200 can be used to capture a sequence of images in which each scene point is imaged under multiple, different exposure values for each spectral filtering characteristic. The resulting image sequence can be fused into a single image having very high dynamic range and very high spectral resolution.

In order to record images under several different exposures for each position of the interference filter, the intensity reduction filter 1502 is preferably rotated at a high cycle rate (e.g., number of cycles per minute) compared to the cycle rate of the spectral filter 204, in order to insure that the time $T_e$ required for a pixel (i,j) to be subjected to the full range of exposure values is much less that the time $T_{\overline{\lambda}}$ required for the pixel to be subjected to the full range of spectral filter characteristics. Exemplary mean wavelength $\overline{\lambda}_{ij}$ and exposure $e_{ij}$ functions 3402 and 3404, respectively, for pixel (i,j) are illustrated in FIGS. 34A and 34B. In the illustrated example, the half-period $T_{\overline{\lambda}}$ of the mean wavelength function 3402 is substantially larger than the period $T_e$ of the exposure function 3403. Furthermore, as is illustrated in FIGS. 34B and 34C, $T_e$ is substantially larger than the integration time $T_p$ of each pixel or frame. As a result, each pixel is subjected to several different exposures for each different mean wavelength. In this case, the brightness at pixel (i,j) in the $n^{th}$ frame of the captured sequence is:

$$B_{ij}^{(n)} = k \int_{(n-1)T_p}^{nT_p} \int_{\overline{\lambda}(t)-\lambda_\omega}^{\overline{\lambda}(t)-\lambda_\omega} e_{ij}(t) W(\lambda; \overline{\lambda}_{ij}(t)) E_{ij}(\lambda, t) s(\lambda) d\lambda dt \quad (14)$$

As explained above, the image detector 202 maps each pixel brightness to a quantized and bounded measured brightness $M^{(n)}{}_{ij}$. The resulting N measured brightness values for each pixel include measurements made under different exposures for each wavelength of incoming radiation. For each wavelength, the pixels representing that wavelength are selected from the images in the recorded sequence, and are fused together to produce a high-dynamic range single-wavelength image using the fusion procedure discussed above with respect to imagers having spatially varying intensity reduction filters. The resulting high-dynamic range, single wavelength images can then be combined to form a single, high-dynamic range, multispectral image. The single-wavelength images are combined similarly to the well-known manner in which R, G, and B color channels are combined in conventional images. However, unlike conventional images, the multispectral images of the present invention, can have far more than three spectral channels, and also have enhanced dynamic range. For example, using the above-described technique with a polychrome, 8-bit video camera, the resulting multispectral images have 30 spectral measurements at each pixel, each measurement having 12 bit brightness accuracy.

Figure 37:
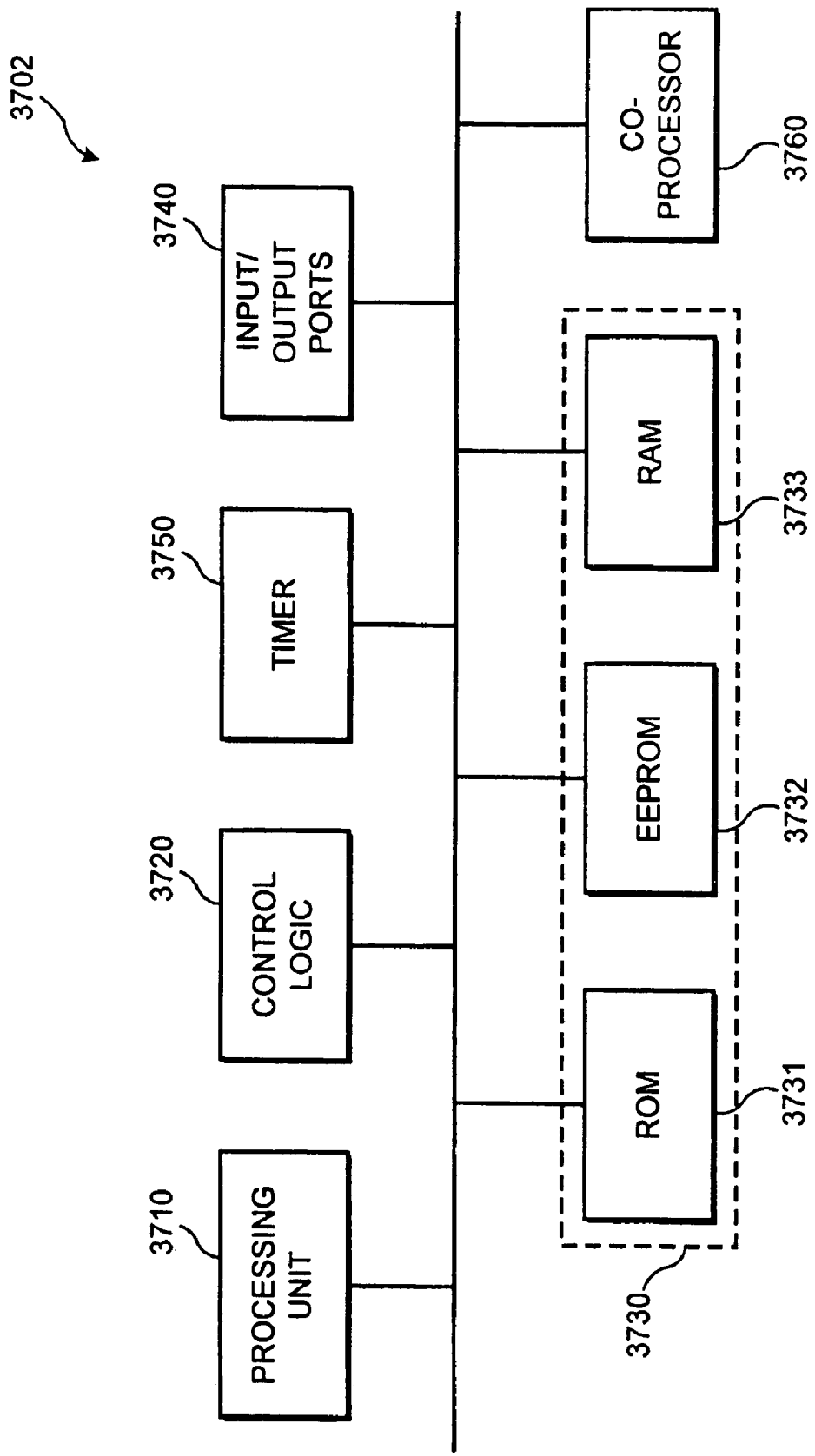
FIG. 37 is a block diagram illustrating an exemplary processor section in accordance with the present invention.

FIG. 37 is a functional block diagram illustrating an exemplary processor section 3702 suitable for processing image data in accordance with the present invention. The illustrated processing section 3702 can, for example, be included in an imager such as the imager 200 illustrated in FIGS. 2A, 2B, 12A, 12B, 15A, 15B, 17, 18, 19B, and 33, and can be used to perform the above-described fusion procedures and other processing of image data in accordance with the present invention (step 120 in FIGS. 1, 16, and 20). The processor section 3702 generally includes a processing unit 3710, control logic 3720 and a memory unit 3730. The processor section 3702 further includes a timer 3750 (i.e., a clock circuit) and input/output ports 3740. The processor section 3702 can also include a co-processor 3760, depending on the microprocessor used in the processing unit 2702. Control logic 3720 provides, in conjunction with processing unit 3710, the control necessary to handle communications between memory unit 3730 and input/output ports 3740. Timer 3750 provides a timing reference signal for processing unit 3710 and control logic 3720. Co-processor 3760 provides an enhanced ability to perform complex computations in real time. Present day processor sections are more likely to have multiple processing units than a co-processor.

Memory unit 3730 can include different types of memory, such as volatile and non-volatile memory and read-only and programmable memory. For example, as shown in FIG. 37, memory unit 3730 can include read-only memory (ROM) 3731, electrically erasable programmable read-only memory (EEPROM) 3732, and random-access memory (RAM) 3733. Different processors, memory configurations, data structures and the like can be used to practice the present invention.

Although the present invention has been described in connection with specific exemplary embodiments, it will be understood by those skilled in the art that various changes, substitutions, and alterations can be made to the disclosed embodiments without departing from the spirit and scope of the present invention as set forth in the appended claims.

We claim:

1. A method for imaging a scene, comprising:
   recording a first image of the scene, comprising:
      receiving a first radiation ray bundle comprising radiation from a first portion of the scene by a first portion of a first optical element included in an imager having an image detector, the first radiation ray bundle having a first chief ray in a reference frame of the imager,
      optically processing the first radiation ray bundle by the first portion of the first optical element for producing a second radiation ray bundle, the first portion of the first optical element having a first optical characteristic with respect to the first radiation ray bundle optically processed by the first portion of the first optical element,
      measuring an intensity of the second radiation ray bundle by the image detector of the imager to derive a first intensity value,
      recording the first intensity value,
      receiving a third radiation ray bundle comprising radiation from a second portion of the scene by a second portion of the first optical element, the third radiation ray bundle having a second chief ray in the reference frame of the imager, the second chief ray being different from the first chief ray,
      optically processing the third radiation ray bundle by the second portion of the first optical element for producing a fourth radiation ray bundle, the second portion of the first optical element having a second optical characteristic with respect to the third radiation ray bundle optically processed by the second portion of the first optical element, the second optical characteristic being different from the first optical characteristic,
      measuring an intensity of the fourth radiation ray bundle by the image detector of the imager to derive a second intensity value, and
      recording the second intensity value;
   moving the first optical element in the reference frame of the imager after recording the first image, such that after moving the first optical element, radiation ray bundles having the first chief ray that are received after moving the first optical element are received by, and optically processed by, at least one of the second portion of the first optical element and a third portion of the first optical element, the third portion of the first optical element having a third optical characteristic with respect to radiation ray bundles having the first chief ray that are received after moving the first optical element optically processed by the third portion of the first optical element, the third optical characteristic being different from the first optical characteristic;

recording a second image after moving the first optical element, comprising:

receiving a fifth radiation ray bundle comprising radiation from the first portion of the scene by the at least one of the second and third portions of the first optical element, the fifth radiation ray bundle having the first chief ray, optically processing the fifth radiation ray bundle by the at least one of the second and third portions of the first optical element, for producing a sixth radiation ray bundle, measuring an intensity of the sixth radiation ray bundle by the image detector of the imager to derive a third intensity value, and recording the third intensity value; and processing the first and third intensity values to derive at least one value representing at least one of an intensity of radiation emanating from the first portion of the scene, a spectral distribution of radiation emanating from the first portion of the scene, a polarization parameter of radiation emanating from the first portion of the scene, and a distance between the imager and the first portion of the scene.

2. A method according to claim 1, wherein optically processing the first radiation ray bundle comprises reducing an intensity of the first radiation ray bundle by a first intensity reduction factor, optically processing the third radiation ray bundle comprises reducing an intensity of the third radiation ray bundle by a second intensity reduction factor, the second intensity reduction factor being different from the first intensity reduction factor, optically processing the fifth radiation ray bundle comprises reducing an intensity of the fifth radiation ray bundle by a third intensity reduction factor, the third intensity reduction factor being different from the first intensity reduction factor.

3. A method according to claim 1, wherein optically processing the first radiation ray bundle comprises spectrally filtering the first radiation ray bundle according to a first spectral filtering characteristic, optically processing the third radiation ray bundle comprises spectrally filtering the third radiation ray bundle according to a second spectral filtering characteristic, the second spectral filtering characteristic being different from the first spectral filtering characteristic, optically processing the fifth radiation ray bundle comprising spectrally filtering the fifth radiation ray bundle according to a third spectral filtering characteristic, the third spectral filtering characteristic being different from the first spectral filtering characteristic.

4. A method according to claim 3, wherein the first spectral filtering characteristic comprises at least one of a first bandpass characteristic, a first low-pass characteristic, and a first high-pass characteristic, the second spectral filtering characteristic comprising at least one of a second bandpass characteristic, a second low-pass characteristic, and a second high-pass characteristic, the third spectral filtering characteristic comprising at least one of a third bandpass characteristic, a third low-pass characteristic, and a third high-pass characteristic.

5. A method according to claim 1, wherein optically processing the first radiation ray bundle comprises polarization filtering the first radiation ray bundle according to a first polarization filtering characteristic, optically processing the third radiation ray bundle comprises polarization filtering the third radiation ray bundle according to a second polarization filtering characteristic, the second polarization filtering characteristic being different from the first polarization filtering characteristic, optically processing the fifth radiation ray bundle comprises polarization filtering the fifth radiation ray bundle according to a third polarization filtering characteristic, the third polarization filtering characteristic being different from the first polarization filtering characteristic.

6. A method according to claim 1, wherein optically processing the first radiation ray bundle comprises adjusting by a first focus distance adjustment amount an object distance of best focus associated with the first radiation ray bundle, optically processing the third radiation ray bundle comprises adjusting by a second focus distance adjustment amount an object distance of best focus associated with the third radiation ray bundle, the second focus distance adjustment amount being different from the first focus distance adjustment amount, optically processing the fifth radiation ray bundle comprises adjusting by a third focus distance adjustment amount an object distance of best focus associated with the fifth radiation ray bundle, the third focus distance adjustment amount being different from the first focus distance adjustment amount.

7. A method according to claim 1, wherein optically processing the first radiation ray bundle comprises deflecting the first radiation ray bundle by a first deflection amount, optically processing the third radiation ray bundle comprises deflecting the third radiation ray bundle by a second deflection amount, the second deflection amount being different from the first deflection amount, optically processing the fifth radiation ray bundle comprises deflecting the fifth radiation ray bundle by a third deflection amount, the third deflection amount being different from the first deflection amount.

8. A method according to claim 1, wherein the imager further includes a second optical element, recording the first image of the scene further comprising: receiving a seventh radiation ray bundle comprising radiation from the first portion of the scene by a first portion of the second optical element; optically processing the seventh radiation ray bundle by the first portion of the second optical element for producing the first radiation ray bundle, the first portion of the second optical element having a fourth optical characteristic with respect to the seventh radiation ray bundle; receiving an eighth radiation ray bundle comprising radiation from the second portion of the scene by a second portion of the second optical element; and optically processing the eighth radiation ray bundle by the second portion of the second optical element for producing the third radiation ray bundle, the second portion of the second optical element having a fifth optical characteristic with respect to the eighth radiation ray bundle, the method further comprising moving the second optical element in the reference frame of the imager between recording the first image and recording the second image, such that, after moving the second optical element, a ninth radiation ray bundle is received by a third portion of the second optical element, the third portion of the second optical element having a sixth optical characteristic with respect to the ninth radiation ray bundle, the sixth optical characteristic being different from the fourth optical characteristic, recording the second image further comprising optically processing the ninth radiation ray bundle by the at least one of the second and third portions of the second optical element for producing the fifth radiation ray bundle.

9. An imager, comprising:
a focusing element;
a first optical element, comprising:

a first optical element portion for receiving a first radiation ray bundle comprising first radiation from a first portion of a scene during a first time period, the focusing element for focusing the first radiation from the first portion of the scene, the first radiation ray bundle having a first chief ray in a reference frame of the imager, the first optical element portion for optically processing the first radiation ray bundle for producing a second radiation ray bundle, the first optical element portion having a first optical characteristic with respect to the first radiation ray bundle, a second optical element portion for receiving a third radiation ray bundle comprising first radiation from a second portion of the scene during the first time period, the focusing element for focusing the first radiation from the second portion of the scene, the third radiation ray bundle having a second chief ray in the reference frame of the imager, the second chief ray being different from the first chief ray, the second optical element portion for optically processing the third radiation ray bundle for producing a fourth radiation ray bundle, the second optical element portion having a second optical characteristic with respect to the third radiation ray bundle, the second optical characteristic being different from the first optical characteristic, and a third optical element portion having a third optical characteristic with respect to radiation ray bundles optically processed thereby, the third optical characteristic being different from the first optical characteristic;

an optical element driver for moving the first optical element in the reference frame of the imager during a second time period after the first time period, such that during a third time period after the second time period, a fifth radiation ray bundle comprising a second radiation from the first portion of the scene is received by at least one of the second and third optical element portions, the focusing element for focusing the second radiation from the first portion of the scene, the fifth radiation ray bundle having the first chief ray, and the at least one of the second and third optical element portions being for optically processing the fifth radiation ray bundle for producing a sixth radiation ray bundle;

an image detector for measuring, during the first time period, an intensity of the second radiation ray bundle and an intensity of the fourth radiation ray bundle for deriving first and second intensity values, respectively, the image detector for measuring an intensity of the sixth radiation ray bundle during the third time period, for deriving a third intensity value;

at least one memory for recording the first and second intensity values as part of a first image, the at least one memory for recording the third intensity value as a part of a second image; and a processor for processing the first and third intensity values to derive at least one value representing at least one of an intensity of radiation emanating from the first portion of the scene, a spectral distribution of radiation emanating from the first portion of the scene, a polarization parameter of radiation emanating from the first portion of the scene, and a distance between the imager and the first portion of the scene.

10. An imager according to claim 9, wherein the first optical element portion comprises a first radiation intensity reduction filter portion, the second optical element portion comprising a second radiation intensity reduction filter portion, the third optical element portion comprising a third radiation intensity reduction filter portion, the first optical characteristic comprising a first intensity reduction factor, the second optical characteristic comprising a second intensity reduction factor, the second intensity reduction factor being different from the first intensity reduction factor, the third optical characteristic comprising a third intensity reduction factor, the third intensity reduction factor being different from the first intensity reduction factor.

11. An imager according to claim 9, wherein the first optical element portion comprises a first spectral filter portion, the second optical element portion comprising a second spectral filter portion, the third optical element portion comprising a third spectral filter portion, the first optical characteristic comprising a first spectral filtering characteristic, the second optical characteristic comprising a second spectral filtering characteristic, the second spectral filtering characteristic being different from the first spectral filtering characteristic, the third optical characteristic comprising a third spectral filtering characteristic, the third spectral filtering characteristic being different from the first spectral filtering characteristic.

12. An imager according to claim 11, wherein the first spectral filtering characteristic comprises at least one of a first bandpass characteristic, a first low-pass characteristic, and a first high-pass characteristic, the second filtering characteristic comprising at least one of a second bandpass characteristic, a second low-pass characteristic, and a second high-pass characteristic, and the third spectral filtering characteristic comprising at least one of a third bandpass characteristic, a third low-pass characteristic, and a third high-pass characteristic.

13. An imager according to claim 9, wherein the first optical element portion comprises a first polarization filter portion, the second optical element portion comprising a second polarization filter portion, the third optical element portion comprising a third polarization filter portion, the first optical characteristic comprising a first polarization filtering characteristic, the second optical characteristic comprising a second polarization filtering characteristic, the second polarization filtering characteristic being different from the first polarization filtering characteristic, the third optical characteristic comprising a third polarization filtering characteristic, and the third polarization filtering characteristic being different from the first polarization filtering characteristic.

14. An imager according to claim 9, wherein the first optical element portion comprises at least one of a first refractive element portion and a first reflective element portion, the second optical element portion comprising at least one of a second refractive element portion and a second reflective element portion, the third optical element portion comprising at least one of a third refractive element portion and a third reflective element portion, the first optical characteristic comprising an amount of adjustment of an object distance of best focus associated with radiation ray bundles processed by the first optical element portion, the second optical characteristic comprising an amount of adjustment of an object distance of best focus associated with radiation ray bundles processed by the second optical element portion, the amount of adjustment of the object distance of best focus associated with radiation ray bundles processed by the second optical element portion being different from the amount of adjustment of the object distance of best focus associated with radiation ray bundles processed by the first optical element portion, the third optical characteristic comprising an amount of adjustment of an object distance of best focus associated with radiation ray bundles processed by the third optical element portion, and the amount of adjustment of the object distance of best focus associated with radiation ray bundles processed by the third optical element portion being different from the amount of adjustment of the object distance of best focus associated with radiation ray bundles processed by the first optical element portion.

15. An imager according to claim 9, wherein the first optical element portion comprises at least one of a first refractive element portion and a first reflective element portion, the second optical element portion comprising at least one of a second refractive element portion and a second reflective element portion, the third optical element portion comprising at least one of a third refractive element portion and a third reflective element portion, the first optical characteristic comprising an amount of deflection of radiation ray bundles processed by the first optical element portion, the second optical characteristic comprising an amount of deflection of radiation ray bundles processed by the second optical element portion, the amount of deflection of radiation ray bundles processed by the second optical element portion being different from the amount of deflection of radiation ray bundles processed by the first optical element portion, the third optical characteristic comprising an amount of deflection of radiation ray bundles processed by the third optical element portion, the amount of deflection of radiation ray bundles processed by the third optical element portion being different from the amount of deflection of radiation ray bundles processed by the first optical element portion.

16. An imager according to claim 9, further comprising:
a second optical element, comprising:
 a fourth optical element portion for receiving a seventh radiation ray bundle comprising third radiation from the first portion of the scene during the first time period, the focusing element for focusing the third radiation from the first portion of the scene, the fourth optical element portion for optically processing the seventh radiation ray bundle for producing the first radiation ray bundle, and the fourth optical element portion having a fourth optical characteristic with respect to the seventh radiation ray bundle,
 a fifth optical element portion for receiving an eighth radiation ray bundle comprising second radiation from the second portion of the scene during the first time period, the focusing element for focusing the second radiation from the second portion of the scene, the fifth optical element portion for optically processing the eighth radiation ray bundle for producing the third radiation ray bundle, the fifth optical element portion having a fifth optical characteristic with respect to the eighth radiation ray, and a sixth optical element portion having a sixth optical characteristic with respect to radiation ray bundles optically processed thereby, the sixth optical characteristic being different from the fourth optical characteristic; and
a second optical element driver for moving the second optical element in the reference frame of the imager during the second time period, such that during the third time period, a ninth radiation ray bundle comprising fourth radiation from the first portion of the scene is received by the sixth optical element portion, the focusing element for focusing the fourth radiation from the first portion of the scene, the sixth optical element portion for optically processing the ninth radiation ray bundle for producing the fifth radiation ray bundle.

* * * * *